(12) United States Patent
Ohhashi et al.

(10) Patent No.: US 8,749,863 B2
(45) Date of Patent: Jun. 10, 2014

(54) PLASTIC ARTICLE, METHOD OF SHAPING PLASTIC ARTICLE, AND OPTICAL SCANNING DEVICE HAVING PLASTIC ARTICLE

(75) Inventors: Takamichi Ohhashi, Kanagawa (JP); Yasuo Yamanaka, Tokyo (JP); Eiichi Hayashi, Kanagawa (JP); Go Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 434 days.

(21) Appl. No.: 13/180,177

(22) Filed: Jul. 11, 2011

(65) Prior Publication Data

US 2012/0013964 A1 Jan. 19, 2012

(30) Foreign Application Priority Data

Jul. 15, 2010 (JP) .................................. 2010-160606

(51) Int. Cl.
*G02B 26/08* (2006.01)

(52) U.S. Cl.
USPC ....................... 359/204.1; 359/205.1; 425/808

(58) Field of Classification Search
USPC ............ 359/204.1–207.9, 662; 425/175, 808; 264/1.1, 1.31, 1.32, 2.2, 2.3, 2.5
See application file for complete search history.

(56) References Cited

U.S. PATENT DOCUMENTS

| | | | |
|---|---|---|---|
| 5,110,515 A | 5/1992 | Nakamura et al. | |
| 2002/0160152 A1 | 10/2002 | Yamanaka et al. | |
| 2009/0073580 A1* | 3/2009 | Hayashi et al. | 359/811 |
| 2010/0054809 A1 | 3/2010 | Takahashi et al. | |

FOREIGN PATENT DOCUMENTS

| | | |
|---|---|---|
| CN | 101372145 A | 2/2009 |
| DE | 39 16 785 A1 | 11/1989 |
| JP | 57-95636 A | 6/1982 |
| JP | 4-208421 A | 7/1992 |
| JP | 6-304973 A | 11/1994 |
| JP | 2842709 B2 | 10/1998 |
| JP | 11-28745 A | 2/1999 |
| JP | 2000-34360 A | 2/2000 |
| JP | 2000-84945 A | 3/2000 |
| JP | 2000-176944 A | 6/2000 |
| JP | 2000-329908 A | 11/2000 |
| JP | 2001-219438 A | 8/2001 |
| JP | 3343491 B2 | 8/2002 |
| JP | 2002-326260 A | 11/2002 |
| JP | 2002-347079 A | 12/2002 |
| JP | 2003-11191 A | 1/2003 |
| JP | 2003-89136 A | 3/2003 |
| JP | 2003-94498 A | 4/2003 |
| JP | 2006-51822 A | 2/2006 |
| JP | 2006-133709 A | 5/2006 |

(Continued)

*Primary Examiner* — James Phan
(74) *Attorney, Agent, or Firm* — Dickstein Shapiro LLP

(57) ABSTRACT

A plastic article is formable by using a metal die having a cavity to accommodate melted resin therein at a given pressure. The plastic article includes a transfer face to which is transferred a face shape of the metal die, a projection disposed at least one face other than the transfer face, an incomplete transfer face having a concave shape disposed at the same face on which the projection is disposed, formed by an incomplete transfer of a face shape of the cavity of the metal die, and an incomplete transfer face having a convex shape disposed at least one face other than the transfer face.

11 Claims, 16 Drawing Sheets

(56) References Cited

FOREIGN PATENT DOCUMENTS

| | | | |
|---|---|---|---|
| JP | 3875475 B2 | 11/2006 |
| JP | 2007-331206 A | 12/2007 |
| JP | 4108195 B2 | 4/2008 |
| JP | 2008-216746 A | 9/2008 |
| JP | 2010-60637 A | 3/2010 |

* cited by examiner

PLASTIC ARTICLE, METHOD OF SHAPING PLASTIC ARTICLE, AND OPTICAL SCANNING DEVICE HAVING PLASTIC ARTICLE

CROSS-REFERENCE TO RELATED APPLICATIONS

This application claims priority to Japanese Patent Application No. 2010-160606, filed on Jul. 15, 2010 in the Japan Patent Office, which is incorporated by reference herein in its entirety.

BACKGROUND OF THE INVENTION

1. Field of the Invention

The present invention relates to a plastic article, a method of shaping the plastic article, and an optical scanning device including the plastic article, and more particularly, to a plastic article used for an optical scanning system of laser type digital copier, a laser printer, or a facsimile machine, an optical device of a video camera, and an optical disk.

2. Description of the Background Art

Plastic articles can be formed using various shaping methods. For example, an injection molding method can be used to form plastic articles with given shapes. Specifically, melted resin material such as hot-melt resin is injected to fill a cavity, having a given volume, defined in a metal die, while the temperature of metal die is set around a given temperature at which the resin can be deformed by heat. Then, the metal die is gradually cooled while controlling the internal pressure of metal die. After the completion of cooling, the metal die is opened to extract out the molded product.

Such injection molding method can be cost-effective for mass production of a plastic article having a special shape, using the metal die adapted for such special shape of the plastic article.

Optical elements, such as lenses and prisms, have heretofore been mainly made of glass, because high degree of precision is demanded for the optical face and internal birefringence. With demand for further cost reduction of products, materials used for forming optical elements have been shifted to plastic, and plastic lenses, plastic mirrors, or the like have come to be widely used.

The plastic article may be shaped into various shapes in view of the application fields of the plastic article. For example, a plastic article having a portion of reduced thickness as a precison transfer area can be formed by transferring a minute and complex concave/convex shape to the transfer area, in which high degree of precision transfer of the metal die shape to the transfer area of the plastic article is required. For example, in the case of the lenses (e.g., f-theta lens) used for an optical scanning system of a laser printer, the shapes of the lenses are designed into a spherical shape or a complex non-spherical shape to reduce the number of parts while maintaining a plurality of capabilities with a limited number of parts. Further, such lenses may be made thin for greater compactness of the apparatus.

The process of shaping the plastic article includes cooling and solidifying the melted resin in the cavity of metal die, and the plastic article can be formed into a desired shape with high degree of precision by maintaining a constant, uniform pressure and temperature within the cavity. However, the speed of cooling and solidifying of the plastic article having a complex uneven thickness shape differs among different portions of the same plastic article, and internal stress may cause sticking of the article to the metal die or other separation failure when the plastic article is removed from the metal die, and the shape deformation such as warping of article after the removing process may occur. For example, internal strain of plastic optical elements may cause birefringence of plastic optical elements.

For example, a plastic article 10 shown in FIG. 1 may be formed or shaped as follows. The plastic article 10 has a transfer face 11, and a cross-sectional face 14 perpendicular to the transfer face 11. The plastic article 10 has a first thickness "a" in a direction perpendicular to the transfer face 11 and a second thickness "b" in a direction parallel to the transfer face 11.

Even at the portion of reduced thickness of the plastic article 10 having the aspect ratio of a/b<1, because the cooling speed in the first thickness "a" direction is faster than the cooling speed in the second thickness "b" direction, the plastic article 10 may be cooled and solidified while retaining the pressure on the transfer face 11, internal stress may cause sticking to the metal die or separation failure when the plastic article is removed from the metal die, and the shape deformation such as warping of article after removing process may occur.

Hereinafter, when plastic articles have a relation of "a/b<1" for the first thickness "a" in a direction perpendicular to the transfer face 11 and the second thickness "b" in a direction parallel to the transfer face 11, such plastic articles may be referred to as a plastic article having thin-thickness shape such as having a portion of reduced thickness or thin-thickness shape plastic article.

Low-pressure injection molding using the lowest possible pressure (called low pressure injection molding) needs to be conducted to reduce the remaining pressure. However, in low pressure injection molding, because the amount of resin injected into the mold is small compared to the cavity volume, shrinkage may likely occur to a plastic article formed by such molding, and due to an increase of resin volume shrinking, the precision with which the shape of the metal die is transferred to the plastic article (hereinafter "transfer precision of the metal die shape") deteriorates.

In view of such shrinkage, JP-H06-304973-A discloses a method of using a gas port, in which air having a given pressure is applied to a non-transfer portion of an article through the gas port to set a pressure difference between the non-transfer portion and a transfer portion of the article to induce the shrinkage at the non-transfer portion of article, by which shrinkage occurrence at the transfer portion may be prevented.

Similarly, JP-H11-28745-A discloses a method of moving one block among the blocks composing a metal die, in which a cavity is defined by the blocks. When an article is formed using the injection molding, resin is injected into the cavity to fill the cavity and a certain pressure is created in the cavity, and a transfer face of the article resin is maintained in close contact with the block at a suitable pressure. While forming the article, one of the blocks defining the cavity is slidably moved in one direction to separate a non-transfer face of article resin from the block. With such block movement, a space is set between the block and the non-transfer face of article resin, by which the shrinkage can be induced at the non-transfer face of article resin.

Further, JP-2000-84945-A discloses a method of forming a plastic article having a thick thickness and/or uneven thickness shape, in which an incomplete transfer portion of an article is set at one portion of the article other than a transfer face of the article, and a concave shape or a convex shape is transferred at such incomplete transfer portion of the article by transferring a cavity shape defined by the metal die, by which the remaining resin internal pressure and internal strain can be reduced.

The shrinkage may occur when the remaining resin internal pressure after the injection filling and resin cooling becomes lower than the air pressure applied to the non-transfer face or portion.

When a plastic article having thin-thickness shape such as having a portion of reduced thickness is formed by the method of JP-H06-304973-A, the resin at the thin-thickness portion is cooled and solidified under high pressure at the earlier stage of cooling and solidifying, by which the internal stress and internal strain remains in the article, and thereby the transfer face precision deteriorates and birefringence deteriorates.

Further, when a plastic article having thin-thickness shape such as having a portion of reduced thickness is formed by the method of JP-H11-28745-A, a separation process of block from the resin is required before a transfer face portion of resin is cooled and solidified, by which the cavity volume is increased as the separation process proceeds and the pressure in the cavity becomes a negative pressure. When the negative pressure occurs to the resin, an adhesiveness of transfer face of article resin becomes low, by which shrinkage may occur to the transfer face of article resin. In light of such situation, a movable block may be used that can follow a volume shrinking of resin. But it is hard to move the movable block precisely while maintaining the stability of the movable block.

Further, when a plastic article having thin-thickness shape such as having a portion of reduced thickness is formed by the method of JP-2000-84945-A, similar to JP-H11-28745-A, when a separation process is conducted before the resin is cooled and solidified, the negative pressure occurs to the resin in the cavity, by which shrinkage may occur to the transfer face of the article resin. Further, even if the shrinkage is induced after the pressure becomes a low level, the cooling and solidifying of resin has already proceeded while the internal stress remains.

Further, the method of JP-H06-304973-A may not completely control a shrinkage inducing area, by which the shrinkage may spread to the transfer face of the article resin. Further, the methods of JP-H11-28745-A and JP-2000-84945-A may not completely control a shrinkage area within the separated block area, by which the shrinkage may spread to the transfer face of the article resin.

The progression or spread of shrinkage area to the transfer face is described with reference a plastic article 10 shown in FIG. 1 to FIG. 3. The plastic article 10 having a transfer face 11 is an article formed by injection molding.

FIG. 2 shows a cross-sectional view of the metal die 30 used for forming the plastic article 10 shown in FIG. 1. FIG. 2 shows a cross-sectional view of the metal die 30 cut at the cross-sectional face 14 of the plastic article 10 made of melted resin such as hot-melt resin 37. The metal die 30 may include at least a pair of metal dies, which can be opened and closed in a given direction, and a cavity is defined by the metal dies. The plastic article 10 can be formed by injecting the hot-melt resin 37 into the cavity. For example, the cavity is defined by an upper transfer block 31, a lower transfer block 32, and a side block 33. The side block 33 may be disposed with a gas slit 35 and a gas port 36 communicated to the gas slit 35. The gas port 36 is connected to a gas compression unit disposed outside of the metal die 30, by which the compressed gas (e.g., air) can be guided to a side face of the cavity. In the method of JP-H06-304973-A, the metal die 30 is used for forming an article by applying an air pressure to the non-transfer portion through the gas port 36, in which the shrinkage is induced to a non-transfer face 22 of the article. However, the shrinkage area may not be confined within the separated block area such as block 33, and the shrinkage may spread to the transfer face 11 of the article resin (see a circle P of FIG. 2).

Further, FIG. 3 shows a cross-sectional view of the metal die 30 for forming the plastic article 10 shown in FIG. 1. FIG. 3 shows a cross-sectional view of the metal die 30 cut at the cross-sectional face 14 of the plastic article 10 made of the hot-melt resin 37. The metal die 30 of FIG. 3 includes a movable block 34 instead of using the gas slit 35 and the gas port 36. Such metal die 30 can be used for the method of JP-H11-28745-A, in which the movable block 34 is slidably moved to induce the shrinkage to the non-transfer portion of the article resin. However, as similar to a case shown in FIG. 2, the shrinkage area may not be confined within the separated block area such as block 33, and the shrinkage may spread to the transfer face 11 of the article resin (see a circle Q of FIG. 3).

SUMMARY

In one aspect of the present invention, a plastic article formable by using a metal die having a cavity to accommodate melted resin therein at a given pressure is devised. The plastic article includes a transfer face to which is transferred a face shape of the metal die, a projection disposed at least one face other than the transfer face, an incomplete transfer face having a concave shape disposed at the same face on which the projection is disposed, formed by an incomplete transfer of a face shape of the cavity of the metal die, and an incomplete transfer face having a convex shape disposed at least one face other than the transfer face.

In another aspect of the present invention, a method of forming and shaping a plastic article using a metal die having blocks defining a cavity is devised. The metal die has blocks defining a cavity, in which a first block has a transfer face to be transferred to the plastic article, a second block has a gas supply route, the second block includes a concave portion to form a projection of the plastic article, the second block is useable as a firstly-face-separating block from the resin, and a movable block is used as one side face of the cavity. The method comprising the steps of: filling the cavity defined by the metal die with melted resin to generate a pressure in the cavity of the metal die; cooling the resin in the cavity for a given time; supplying compressed gas through the gas supply route to the cavity when the given time elapses after filling the cavity with resin; and slidably moving the movable block in a separation direction away from the cavity.

In another aspect of the present invention, a method of forming and shaping a plastic article using a metal die having blocks defining a cavity is devised. The a metal die has blocks defining a cavity, in which a first block has a transfer face to be transferred to the plastic article, a second block has a face made of material having a low adhesiveness with the resin compared to the surface of other blocks defining the cavity, the second block includes a concave portion to form a projection of the plastic article, the second block is useable as a firstly-face-separating block from the resin, and a movable block is used as one side face of the cavity. The method comprising the steps of: filling the cavity defined by the metal die with melted resin to generate a pressure in the cavity of the metal die; cooling the resin in the cavity for a given time; slidably moving the movable block in a separation direction away from the cavity when the given time elapses after filling the cavity with resin.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
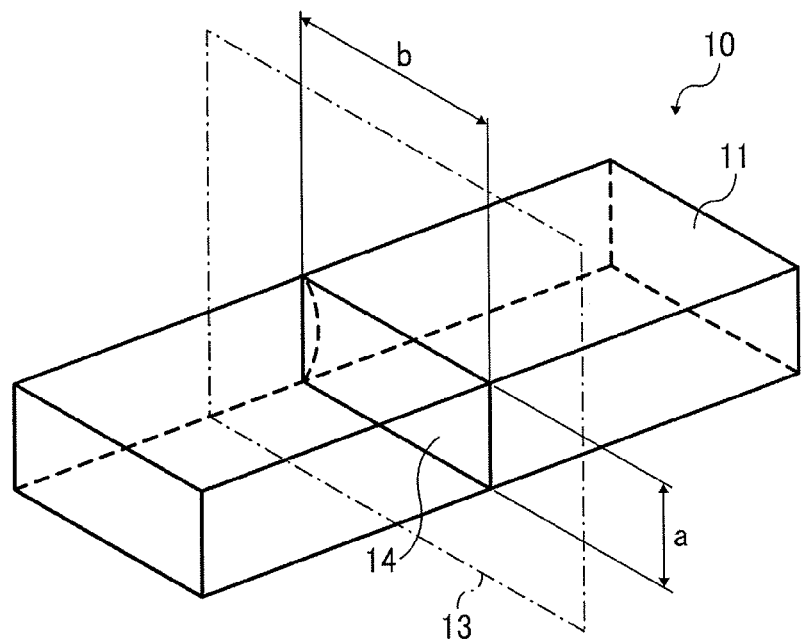
FIG. 1 shows a perspective view of plastic article made by a conventional method.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner. Referring now to the drawings, a plastic article, and a shaping method of plastic article according to example embodiment is described hereinafter.

A description is given of concept of a plastic article and a shaping method of plastic article for the present invention.

Plastic Article

Figure 4:
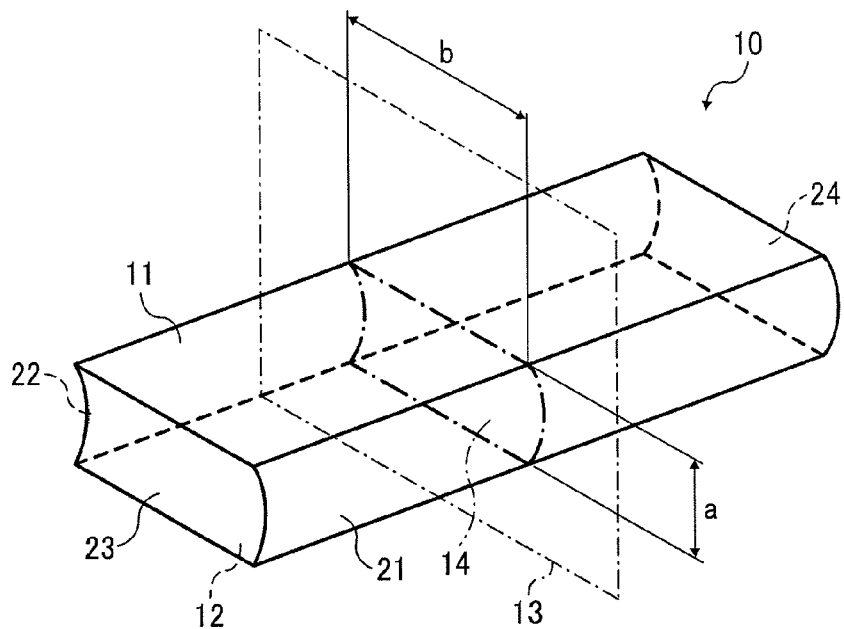
FIG. 4 shows a perspective view of one example of plastic article.

FIG. 4 shows a perspective view of a plastic article 10 formed by a method based on a concept of the present invention. The plastic article 10 has a first transfer face 11 and a second transfer face 12 as upper and lower faces respectively, and side faces such as a first incomplete transfer face 21 having a convex shape and a second incomplete transfer face 22 having a concave shape at the opposing side faces of the plastic article 10. Further, the plastic article 10 has other side faces such as side faces 23 and 24, which may be used as a transfer face, which are transferred with a face shape of cavity, or the side faces 23 and 24 may be used as an incomplete transfer face. The incomplete transfer face may be also referred to as the not-exactly-transferred face, in which the face shape of cavity is not exactly transferred on resin forming the plastic article 10.

Further, the plastic article 10 may have thin-thickness shape such as having a portion of reduced thickness. Specifically, when the plastic article 10 is cut at a face (see dashed dotted line 13 in FIG. 4) perpendicular to both of the first transfer face 11 and the second transfer face 12, (i.e., cross-sectional face 14 of the plastic article 10), the first thickness "a" in a direction perpendicular to the transfer face 11 and the second thickness "b" in a direction parallel to the transfer face 11 satisfy the following formula (1).

$$a/b<1 \tag{1}$$

The values of "a" and "b" may be, for example, a=5 mm and b=10 m, but not limited thereto as along as the values of "a" and "b" can satisfy the formula (1).

One Concept of Shaping Method of Plastic Article

Figure 5A:
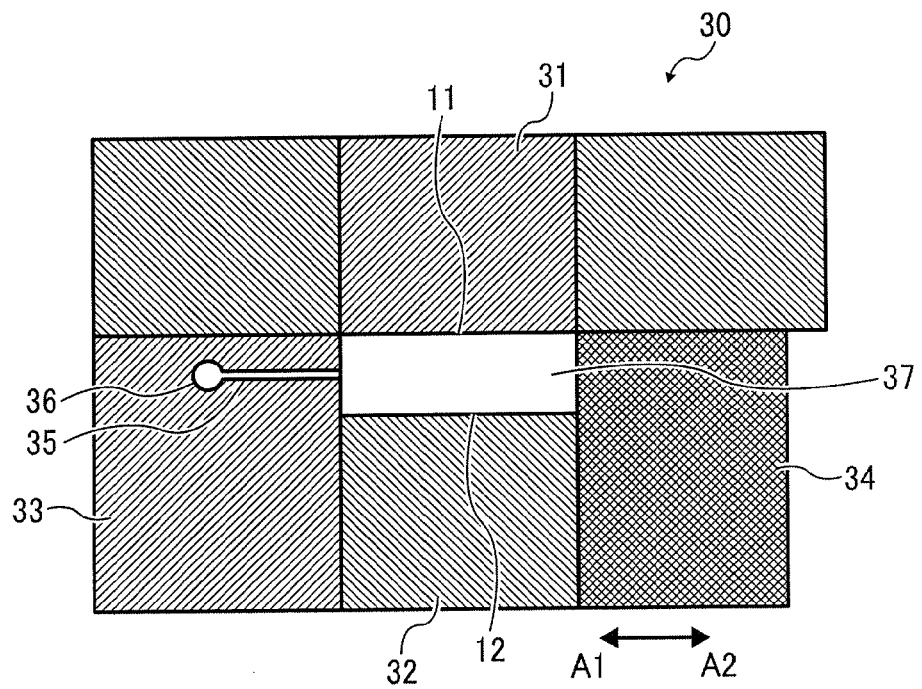
FIGS. 5A and 5B show a cross-sectional view of a metal die for forming the plastic article of FIG. 4.
Figure 5B:
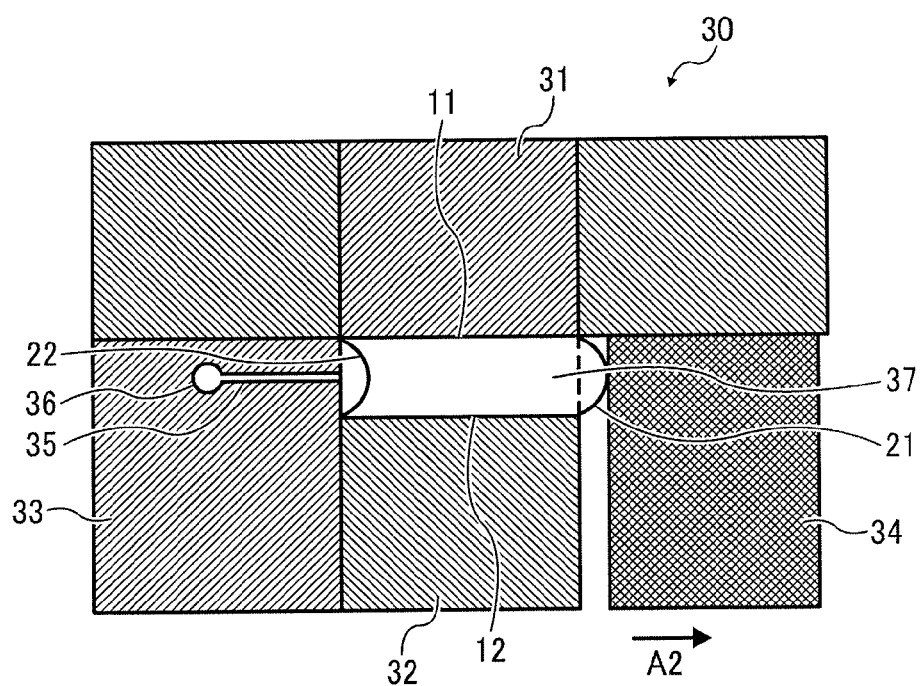

A description is given of an example shaping method of plastic article 10 shown in FIG. 4 with reference to FIGS. 5A and 5B. FIGS. 5A and 5B show a cross-sectional view at the cross-sectional face 14 of the plastic article 10 which is made of the melted resin such as hot-melt resin 37, in which the metal die 30 defines the cavity.

The metal die 30 may include a pair of metal dies such as upper and lower dies which can be moved in upward and downward, and a cavity can defined by the metal dies. The cavity can be injected and filled with the hot-melt resin 37.

Specifically, the cavity can be defined by the upper transfer block 31, the lower transfer block 32, a side block 33, and a side block 34.

The side block 33 may be provided with a gas supply route such as a gas slit 35 and a gas port 36 communicated with the gas slit 35. The gas port 36 is connected to a gas compression unit disposed outside of the metal die 30, by which compressed gas (e.g., air) can be supplied to a side of cavity from the gas slit 35.

The side block 34 may be used the movable block 34. Specifically, the movable block 34 can be slidably moved in a direction shown by an arrow A1/A2 in FIGS. 5A and 5B with respect to the cavity.

The movable block 34 can be slidably moved toward the cavity in a direction shown by an arrow A1 in FIG. 5A and set at a given position as shown in FIG. 5A, and then the hot-melt resin 37 is injected and filled in the cavity. Upon injecting and filling the hot-melt resin 37 in the cavity, a certain pressure occurs on the side faces of the cavity, and then the hot-melt resin 37 starts to cool and solidify while maintaining a closely contacted condition with the side faces of the cavity.

After injecting the hot-melt resin 37 in the cavity, a given time needs to be elapsed to completely cool and solidify the hot-melt resin 37. In other words, the hot-melt resin 37 injected and filled in the cavity is not yet cooled and solidified for a given time, and can maintain fluid condition while also maintaining the resin internal pressure at a given level. While the hot-melt resin 37 still maintains such fluid condition, compressed gas (e.g., air) is supplied to the hot-melt resin 37 through the gas port 36 and the gas slit 35. The time duration that the hot-melt resin 37 can maintain such fluid condition at a given resin internal pressure, which is not yet completely cooled and solidified, can be determined based on types of resin component or other factors.

Further, as shown in FIG. 5B, the movable block 34 can be slidably moved in a direction separating from the side face of cavity in a direction shown by an arrow A2 in FIG. 5B, which is a separation direction of movable block 34. The cavity volume expands due to the movement of the movable block 34 (retreating movement of the movable block 34), and the volume of the hot-melt resin 37 also expands. As a result, the first incomplete transfer face 21 having the convex shape is formed at a portion corresponding to the retreated movement of the movable block 34.

Further, due to the volume expansion of the hot-melt resin 37, the resin internal pressure falls rapidly, by which the adhesiveness of the hot-melt resin 37 with the side faces of cavity becomes low. Under such condition, the resin pressurized by the compressed gas (e.g., air) supplied from the gas slit 35 can be firstly separated from the side block 33, by which the second incomplete transfer face 22 having the concave shape can be formed. As such, the side block 33 is used as a firstly-face-separating block.

With such a configuration, resin volume decrease (or shortage) due to the fall of resin internal pressure and the volume shrink of the filled resin due to the progression of cooling and solidifying can be mitigated by separating the first incomplete transfer face 21 having the convex shape and the second incomplete transfer face 22 having the concave shape from the side faces of cavity, in which the first incomplete transfer face 21 and/or the second incomplete transfer face 22 can be used as a transfer-free face of the plastic article 10. The transfer-free face is a face of the plastic article 10 that is formed without an exact transfer of shape of the side face of the cavity. By inducing a transfer failure phenomenon to the first incomplete transfer face 21 and the second incomplete transfer face 22, an occurrence of shrinkage to the first transfer face 11 and the second transfer face 12 can be suppressed or reduced.

Further, the internal pressure of resin filled in the cavity of metal die by the injection method can be reduced to substantially zero by dropping the internal pressure by expanding the cavity volume. Further, under such condition, the internal stress and internal strain of the plastic article 10 cooled and solidified can be set closer to substantially zero. Therefore, the plastic article 10 can be formed by enhancing the shaping precision of the first transfer face 11 and the second transfer face 12 and by suppressing an occurrence of birefringence.

Another Concept of Shaping Method of Plastic Article

Figure 6A:
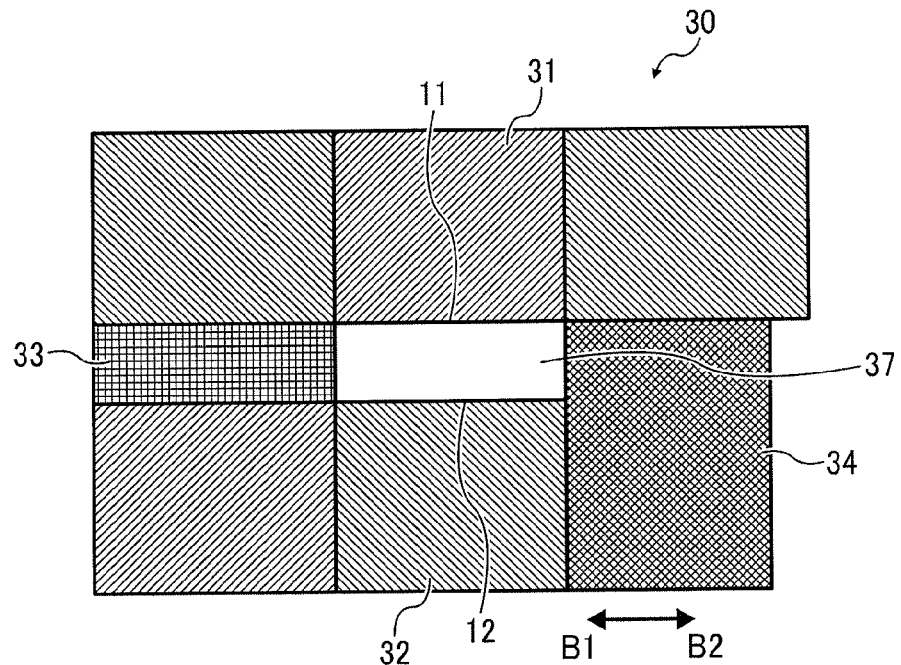
FIGS. 6A and 6B show a cross-sectional view of another metal die for forming the plastic article of FIG. 4.
Figure 6B:
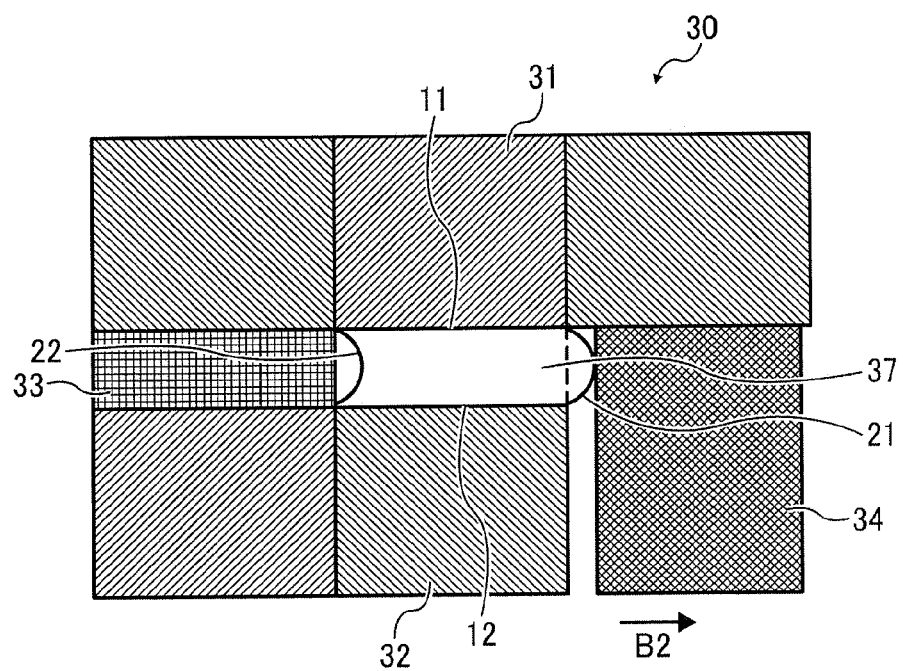

A description is given of another example shaping method of plastic article 10 with reference to FIGS. 6A and 6B. FIGS. 6A and 6B show a cross-sectional view at the cross-sectional face 14 of the plastic article 10, which is made of the hot-melt resin 37, in which the metal die 30 defines the cavity.

The metal die 30 may include a pair of metal dies such as upper and lower dies which can be moved in upward and downward, and a cavity can defined by the metal dies. The cavity can be injected and filled with the hot-melt resin 37. Specifically, the cavity can be defined by the upper transfer block 31, the lower transfer block 32, a side block 33, and a side block 34.

The side block 33 may be used as a fixed block 33. The surface of fixed block 33 that contacts the hot-melt resin 37 may be made of material having an adhesiveness set smaller than material of the surface of other blocks defining the cavity. As such, the fixed block 33 that contacts the hot-melt resin 37 can be used as firstly-face-separating block. Such materials having small adhesiveness with respect to resin may be, for example, titanium nitride (TiN), titanium cyanide (TiCN), metal including resin such as Teflon (registered trademark) or the like, but not limited thereto. In such a configuration, the surface of fixed block 33 may be treated by a material having a low or small adhesiveness with respect to resin, by which the fixed block 33 and the filled resin can be easily separated.

The side block 34 may be used a movable block 34. Specifically, the movable block 34 can be slidably moved in a direction shown by an arrow B1/B2 in FIGS. 6A and 6B with respect to the cavity.

The movable block 34 can be slidably moved toward the cavity in a direction shown by an arrow B1 in FIG. 6A and set at a given position as shown in FIG. 6A, and then the hot-melt resin 37 is injected and filled in the cavity. Upon injecting and filling the hot-melt resin 37 in the cavity, a certain pressure occurs on the side faces of the cavity, and then the hot-melt resin 37 starts to cool and solidify while maintaining a closely contacted condition with the side faces of the cavity.

After injecting the hot-melt resin 37 in the cavity, a given time needs to be elapsed to completely cool and solidify the hot-melt resin 37. In other words, the hot-melt resin 37 injected and filled in the cavity is not yet cooled and solidified for a given time, and can maintain fluid condition while also maintaining resin internal pressure at a given level. While the hot-melt resin 37 still maintains such fluid condition, the movable block 34 can be slidably moved in a direction to separate the movable block 34 from the side face of cavity in a direction shown by an arrow B2 in FIG. 6B (separation direction of movable block 34). The time duration that the hot-melt resin 37 can maintain such fluid condition at a given resin internal pressure, which is not yet completely cooled and solidified, can be determined based on types of resin component, the surface material of the fixed block 33, or other factors.

Further, as shown in FIG. 6B, the cavity volume expands due to the movement of the movable block 34 (retreating movement of the movable block 34), and the volume of the hot-melt resin 37 also expands. As a result, the first incomplete transfer face 21 having the convex shape is formed at a portion corresponding to the retreated movement of the movable block 34. Further, due to the volume expansion of the hot-melt resin 37, the resin internal pressure falls rapidly, by which the adhesiveness of the hot-melt resin 37 with the side faces of cavity becomes low.

Under such condition, the resin can be firstly separated from the surface of the fixed block 33 having a higher separation performance compared to the surfaces of other blocks defining or configuring the cavity, by which the second incomplete transfer face 22 having the concave shape can be formed.

With such a configuration, resin volume decrease (or shortage) due to the fall of resin internal pressure and the volume shrink of the filled resin due to the progression of cooling and solidifying can be mitigated by separating the first incomplete transfer face 21 having the convex shape and the second incomplete transfer face 22 having the concave shape from the side faces of cavity, in which the first incomplete transfer face 21 and/or the second incomplete transfer face 22 can be used as a transfer-free face of the plastic article 10. In other words, by inducing a transfer failure phenomenon to the first incomplete transfer face 21 and/or the second incomplete transfer face 22, an occurrence of shrinkage to the first transfer face 11 and the second transfer face 12 can be suppressed or reduced.

Further, the internal pressure of resin filled in the cavity of metal die by the injection method can be reduced to substantially zero by dropping the internal pressure by expanding the cavity volume. Further, under such condition, the internal stress and internal strain of the plastic article 10 cooled and solidified can be set closer to substantially zero. Therefore, the plastic article 10 can be formed by enhancing the shaping precision of the first transfer face 11 and the second transfer face 12 and by suppressing an occurrence of birefringence.

Figure 2:
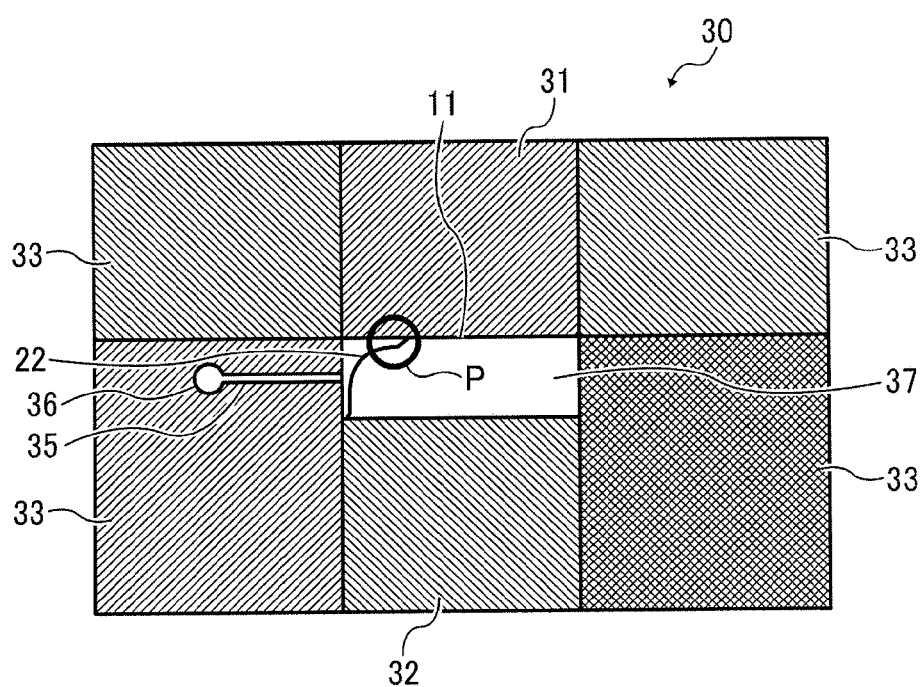
FIG. 2 shows one example condition of shrinkage at a transfer face of plastic article made by a conventional method.
Figure 3:
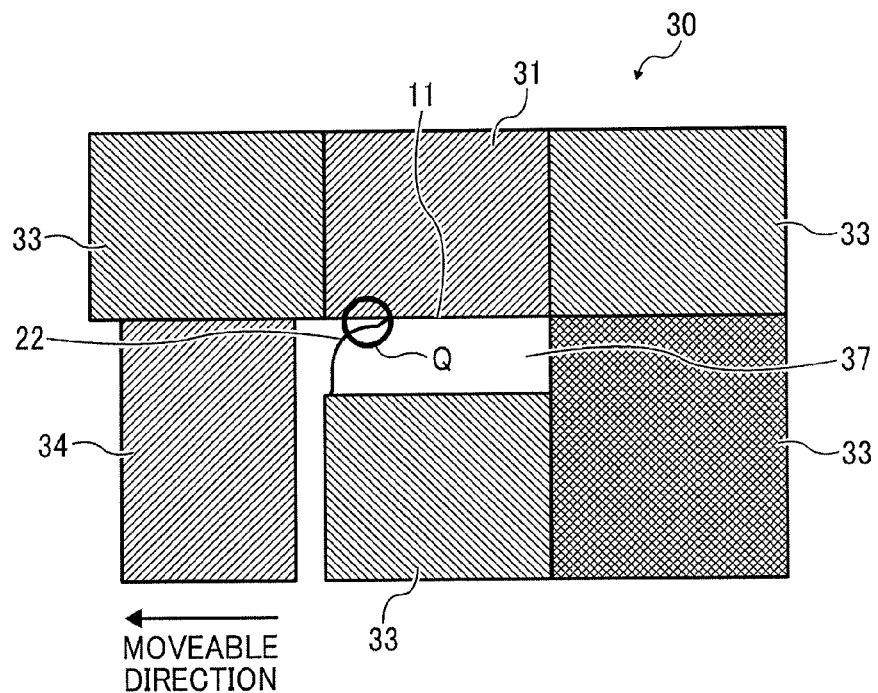
FIG. 3 shows another example condition of shrinkage at a transfer face of plastic article made by a conventional method.

The above described concepts for plastic article and shaping method of plastic article have some effectiveness to a drawback of conventional arts that a shrinkage area is not confined within a non-essential area but may spread to a transfer face of plastic article (see FIGS. 1 to 3). As such, the above described concepts may have some effectiveness for suppressing a spread of shrinkage area to a transfer face.

In addition to such effect of the above described concepts, a spread of shrinkage to a transfer face can be further suppressed or reduced, and the shape precision of transfer face can be further enhanced by employing a given processing to a plastic article. In the following descriptions, descriptions are now given of a plastic article having a projection according to example embodiments.

First Example Embodiment

Plastic Article

Figure 7:
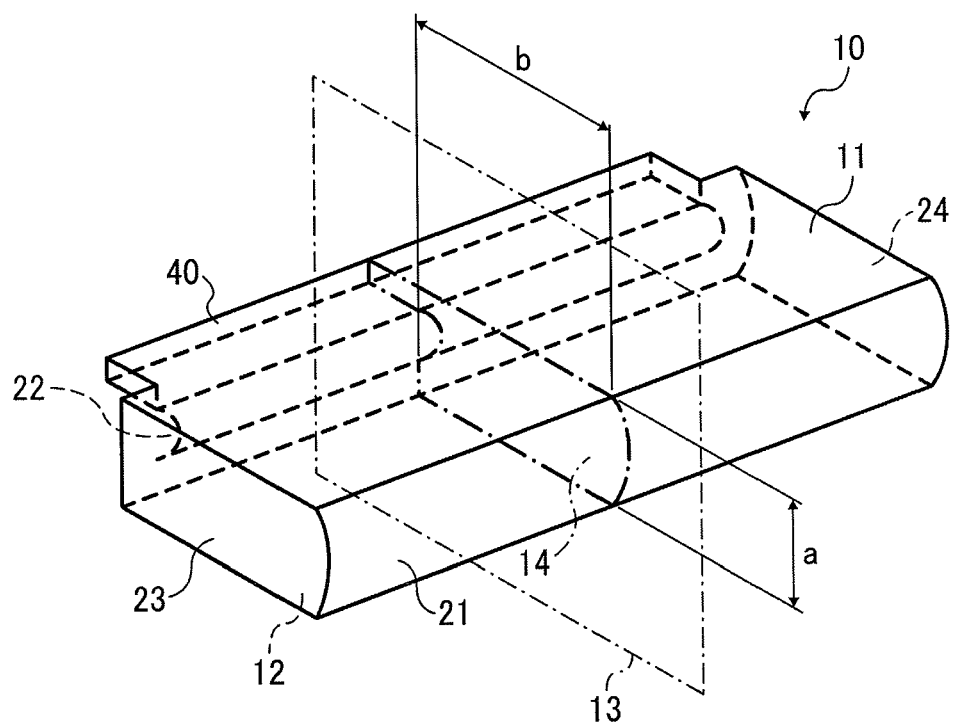
FIG. 7 shows a perspective view of a plastic article according to a first example embodiment.

FIG. 7 shows a perspective view of the plastic article 10 according to a first example embodiment. The plastic article 10 has the first transfer face 11 and the second transfer face 12 as upper and lower faces, and side faces such as the first incomplete transfer face 21 having the convex shape and the second incomplete transfer face 22 having the concave shape at the opposing side faces of the plastic article 10. Further, the plastic article 10 has a projection 40. Further, the plastic article 10 has other side faces such as side faces 23 and 24, which may be used as transfer faces transferred with the cavity shape or may be used as incomplete transfer faces.

The second incomplete transfer face 22 having the concave shape and the projection 40 may be disposed on a same face of the plastic article 10. Further, the second incomplete transfer face 22 having the concave shape may be preferably disposed proximity of the projection 40 such as a root portion of the projection 40. As such, the second incomplete transfer face 22 may be adjacent to the projection 40.

Further, the plastic article 10 of FIG. 7 may have a thin-thickness shape such as having a portion of reduced thickness. Specifically, when the plastic article 10 is cut at a face (see dashed dotted line 13 of FIG. 7) perpendicular to both of the first transfer face 11 and the second transfer face 12 (i.e., cross-sectional face 14 of the plastic article 10), the first thickness "a" in a direction perpendicular to the transfer face 11 and the second thickness "b" in a direction parallel to the transfer face 11 may satisfy the above formula (1).

$$a/b<1 \tag{1}$$

However, the plastic article according to example embodiments of the present invention may not necessary satisfy the above formula (1), which means the first thickness "a" in the direction perpendicular to the transfer face 11 and the second thickness "b" in the direction parallel to the transfer face 11 may not need to satisfy the above formula (1). Therefore, the first thickness "a" and the second thickness "b" can be set to a relation of "a/b≥1." Accordingly, the plastic article may not need to be a thin-thickness shape entirely. For example, the plastic article may be an article of uneven thickness having a portion of reduced thickness.

Shaping Method of Plastic Article

Figure 8A:
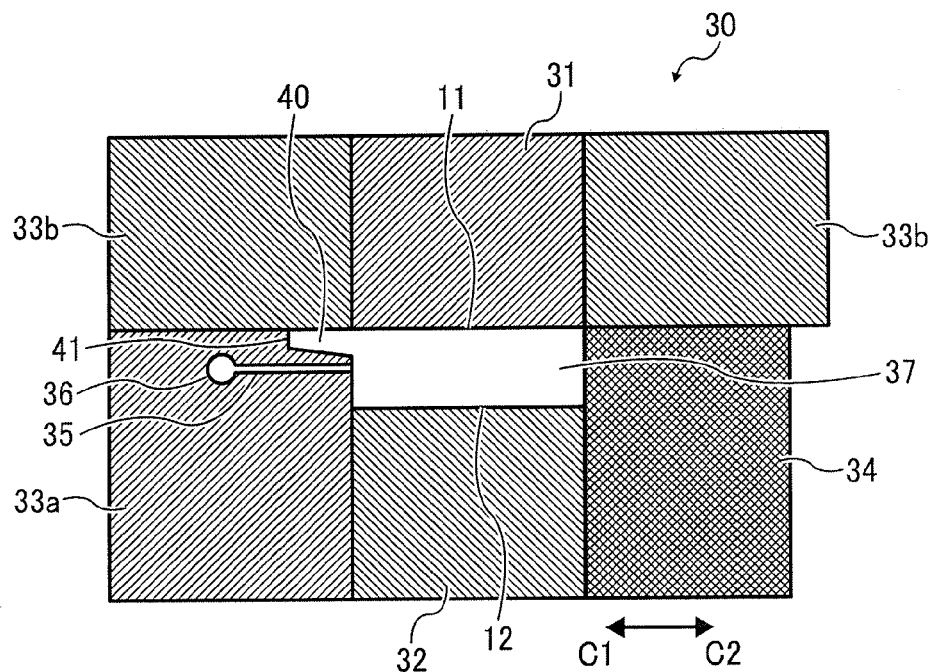
FIGS. 8A and 8B show a cross-sectional view of one metal die for forming the plastic article of FIG. 7.
Figure 8B:
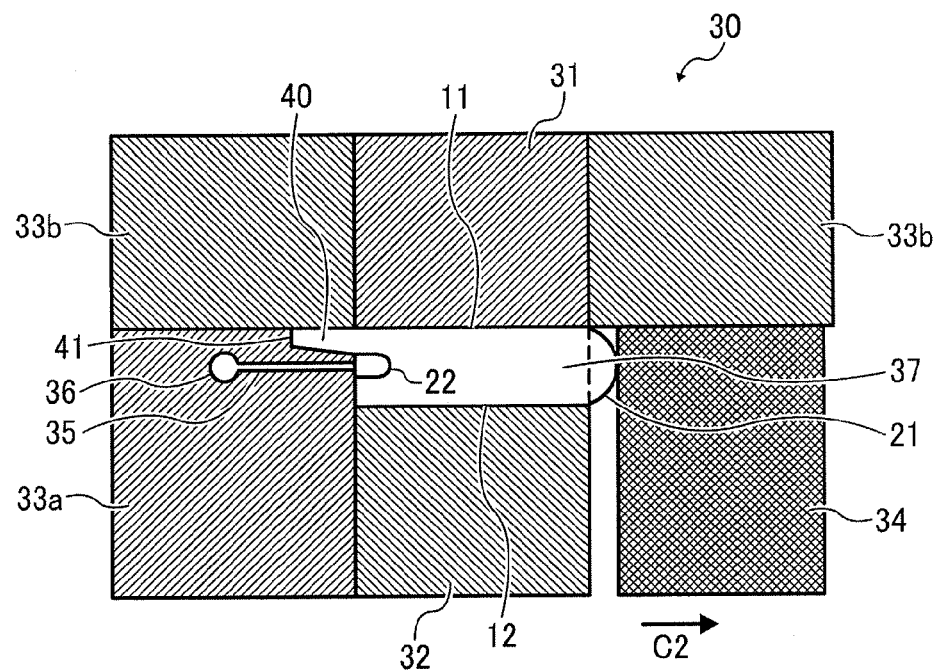

A description is given of an example shaping method, which is a first type method, of the plastic article 10 shown in FIG. 7 with reference to FIGS. 8A and 8B. FIGS. 8A and 8B show a cross-sectional view at the cross-sectional face 14 of the metal die 30 and the plastic article 10 (FIG. 7) made of the hot-melt resin 37.

The metal die 30 may include a pair of metal dies such as the upper and lower dies which can be moved in upward and downward, and a cavity can be defined by such metal dies. The cavity can be injected and filled with the hot-melt resin 37. Specifically, the cavity can be defined by the upper transfer block 31 and the lower transfer block 32, a side block 33 including the side block 33a and the side block 33b, and the side block 34.

The side block 33a may be provided with a gas supply route such the gas slit 35 and the gas port 36 communicated with the gas slit 35. The gas port 36 is connected to a gas compression unit disposed externally from the metal die 30, by which compressed gas (e.g., air) can be supplied to a side of cavity from the gas slit 35. The gas of compressed gas may be air, but not limited thereto and other gas can be used.

Further, the side block 33a may have a concaved portion 41, which is used for forming the projection 40. Further, the side block 33a may not need to be a single block, but the side block 33a can be configured with two or more blocks such as one block having the concaved portion 41 and another block having the gas supply route.

The side block 34 may be used a movable block 34. Specifically, the movable block 34 can be slidably moved in a direction shown by an arrow C1/C2 in FIGS. 8A and 8B with respect to the cavity.

The movable block 34 can be slidably moved toward the cavity in a direction shown by an arrow C1 in FIG. 8A and set at a given position as shown in FIG. 8A, and then the hot-melt resin 37 is injected and filled in the cavity. Upon injecting and filling the hot-melt resin 37 in the cavity, a certain pressure occurs on the side faces of the cavity, and then the hot-melt resin 37 starts to cool and solidify while maintaining a closely contacted condition with the side faces of the cavity.

After injecting the hot-melt resin 37 in the cavity, a given time needs to be elapsed to completely cool and solidify the hot-melt resin 37. In other words, the hot-melt resin 37 injected and filled in the cavity is not yet cooled and solidified for a given time, and can maintain fluid condition while also maintaining the resin internal pressure at a given level. While the hot-melt resin 37 still maintains such fluid condition, compressed gas (e.g., air) is supplied to the hot-melt resin 37 through the gas port 36 and the gas slit 35. The time duration that the hot-melt resin 37 can maintain such fluid condition at a given resin internal pressure, which is not yet completely cooled and solidified, can be determined based on types of resin component or other factors.

Further, as shown in FIG. 8B, the movable block 34 can be slidably moved in a direction separating from the side face of cavity in a direction shown by an arrow C2 in FIG. 8B (separation direction). The cavity volume expands due to the movement of the movable block 34 (retreating movement of the movable block 34), and the volume of the hot-melt resin 37 also expands. As a result, the first incomplete transfer face 21 having the convex shape is formed at a portion corresponding to the retreated movement of the movable block 34. Further, due to the volume expansion of the hot-melt resin 37, the resin internal pressure falls rapidly, by which the adhesiveness of the hot-melt resin 37 with the side faces of cavity becomes low.

Under such condition, the resin pressurized by the compressed gas (e.g., air) supplied from the gas slit 35 can be firstly separated from the side block 33a, by which the second incomplete transfer face 22 having the concave shape can be formed.

With such a configuration, resin volume decrease (or shortage) due to the fall of resin internal pressure and the volume shrink of the filled resin due to the progression of cooling and solidifying can be mitigated by separating the first incomplete transfer face 21 having the convex shape and the second incomplete transfer face 22 having the concave shape from the side faces of cavity, in which the first incomplete transfer face 21 and/or the second incomplete transfer face 22 can be used as a transfer-free face of the plastic article 10. In other words, by inducing a transfer failure phenomenon to the first incomplete transfer face 21 and/or the second incomplete transfer face 22, an occurrence of shrinkage to the first transfer face 11 and the second transfer face 12 can be suppressed or reduced.

Further, the internal pressure of resin filled in the cavity of metal die by the injection method can be reduced to substantially zero by dropping the internal pressure by expanding the cavity volume. Further, under such condition, the internal stress and internal strain of the plastic article 10 cooled and solidified can be set closer to substantially zero.

The projection 40 can be cooled and solidified faster than other portions of resin such as a transfer face area of the cavity. After separating the resin from the side block 33a, the second incomplete transfer face 22 having the concave shape can grow by a shrinking phenomenon of resin, and can be formed along a root of the projection 40 having a faster shrinking speed. Accordingly, by disposing the projection 40 (prepared by setting the concaved portion 41), the growing of the second incomplete transfer face 22 having the concave shape can be confined to a given area of the plastic article 10.

With such a configuration, the shrinkage may not spread or progress to the first transfer face 11 and the second transfer face 12, and the resin internal pressure may not remain inside the plastic article 10. Therefore, the plastic article 10 can be formed by enhancing the shape precision of the first transfer face 11 and the second transfer face 12, shaped with the required shape precision, and by lowering the internal strain.

As such, in the plastic article, the projection is disposed at a face other than the transfer face, and one incomplete transfer face having the concave shape can be disposed at the same face having the projection using the above described metal die defining a given shape for the cavity, and another incomplete transfer face having the convex shape is disposed at a face other than the transfer face. Therefore, the plastic article can be formed by enhancing the shape precision of the first transfer face, shaped with the required shape precision, and by lowering the internal stress and internal strain, and thereby the birefringence can be reduced.

In the plastic article, the resin internal pressure occurs when forming the plastic article. By disposing the incomplete transfer face having the convex shape at a face other than the transfer face, the pressure can be reduced after transferring the side face of the cavity to the resin. Further, by disposing the incomplete transfer face having the convex shape, the shrinkage caused by the negative pressure of pressure can be mitigated. When the projection is disposed, the projection has a resin amount smaller than the volume of cavity, and can be closely contacted to the metal die, in which due to the relatively greater contact area, the resin can be cooled and solidified at a fast speed at the projection. Further, the incomplete transfer face having the concave shape may grow along the root of the projection solidifying at a fast speed, by which the shrinkage can be induced to such area. Further, because the plastic article can be cooled and solidified under the reduced pressure, the residual internal stress can be reduced and the shape deformation when removing or after removing the resin from the cavity can be suppressed, by which the plastic article can be formed by enhancing the shape transfer performance for the transfer face.

Shaping Method of Plastic Article

Figure 9A:
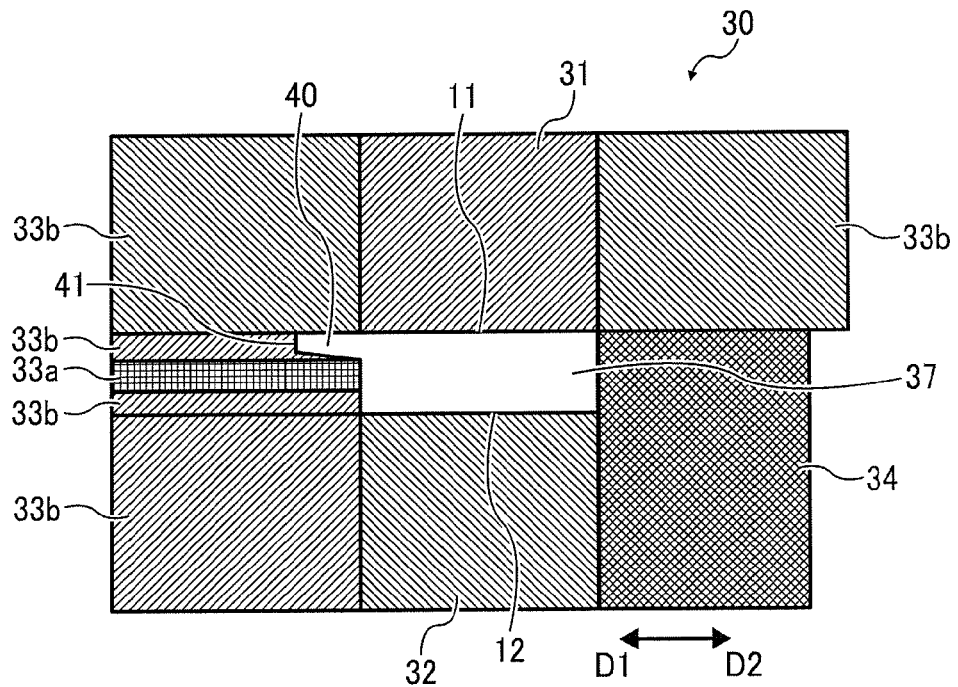
FIGS. 9A and 9B show a cross-sectional view of another metal die for forming the plastic article of FIG. 7.
Figure 9B:
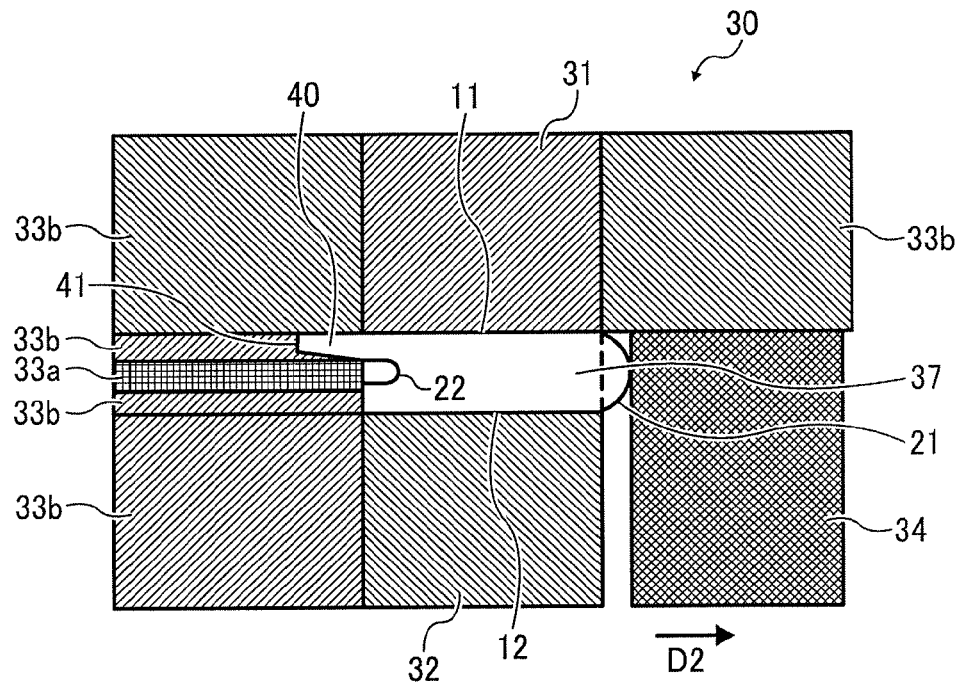

A description is given of another example shaping method, which is a second type method, of plastic article 10 shown in FIG. 7 with reference to FIGS. 9A and 9B. FIGS. 9A and 9B show a cross-sectional view at the cross-sectional face 14 of the metal die 30 and the plastic article 10 (FIG. 7) made of the hot-melt resin 37.

The metal die 30 may include a pair of metal dies such as the upper and lower dies which can be moved in upward and downward, and a cavity can be defined by such metal dies. The cavity can be injected and filled with the hot-melt resin 37. Specifically, the cavity can be defined by the upper transfer block 31 and the lower transfer block 32, the side block 31 including the side block 33a and the side block 33b, and the side block 34.

The side block 33a may be used as a fixed block 33a. The entire surface of the fixed block 33a or at least a portion of surface of the fixed block 33a that contacts the hot-melt resin 37 may be made of material having an adhesiveness set smaller than material of the surface of other blocks defining the cavity. As such, the surface of fixed block 33a that contacts the hot-melt resin 37 may be used as firstly-face-separating block. Such materials having small adhesiveness with the resin may be, for example, titanium nitride (TiN), titanium cyanide (TiCN), metal including resin such as Teflon (registered trademark) or the like. In such a configuration, the surface of fixed block 33a may be treated by a material having a low or small adhesiveness with respect to resin, by which the fixed block 33a and the filled resin can be easily separated.

The side block 34 may be used a movable block 34. Specifically, the movable block 34 can be slidably moved in a direction shown by an arrow D1/D2 in FIG. 9A with respect to the cavity.

The movable block 34 can be slidably moved toward the cavity in a direction shown by an arrow D1 in FIG. 9A and set at a given position as shown in FIG. 9A, and then the hot-melt resin 37 is injected and filled in the cavity. Upon injecting and filling the hot-melt resin 37 in the cavity, a certain pressure occurs on the side faces of the cavity, and then the hot-melt resin 37 starts to cool and solidify while maintaining a closely contacted condition with the side faces of the cavity.

After injecting the hot-melt resin 37 in the cavity, a given time needs to be elapsed to completely cool and solidify the hot-melt resin 37. In other words, the hot-melt resin 37 injected and filled in the cavity is not yet cooled and solidified for a given time, and can maintain fluid condition while also maintaining resin internal pressure at a given level. While the hot-melt resin 37 still maintains such fluid condition, the movable block 34 can be slidably moved in a direction to separate the movable block 34 from the side face of cavity in a direction shown by an arrow D2 in FIG. 9B (separation direction of movable block 34). The time duration that the hot-melt resin 37 can maintain such fluid condition at a given resin internal pressure, which is not yet completely cooled and solidified, can be determined based on types of resin component, the surface material of the fixed block 33a, or other factors.

As shown in FIG. 9B, the cavity volume expands due to the movement of the movable block 34 (retreating movement of the movable block 34), and the volume of the hot-melt resin 37 also expands. As a result, the first incomplete transfer face 21 having the convex shape is formed at a portion corresponding to the retreated movement of the movable block 34. Further, due to the volume expansion of the hot-melt resin 37, the resin internal pressure falls rapidly, by which the adhesiveness of the hot-melt resin 37 with the side faces of cavity becomes low.

Under such condition, the resin can be firstly separated from the surface of the fixed block 33a having a higher separation performance compared to the surfaces of other blocks defining or configuring the cavity, by which the second incomplete transfer face 22 having the concave shape can be formed.

The projection 40 can be cooled and solidified faster than other portions of resin such as a transfer face area of the cavity. After separating the resin from the side block 33a, the second incomplete transfer face 22 having the concave shape can grow by a shrinking phenomenon of resin, and can be formed along a root of the projection 40 having a faster shrinking speed. By disposing the projection 40 (prepared by setting the concaved portion 41), the growing of the second incomplete transfer face 22 having the concave shape can be confined in a given area of the plastic article 10.

With such a configuration, the shrinkage may not spread or progress to the first transfer face 11 and the second transfer face 12, and the resin internal pressure may not remain inside the plastic article 10. Therefore, the plastic article 10 can be formed by enhancing the shape precision of the first transfer face 11 and the second transfer face 12, shaped with the required shape precision, and by lowering the internal strain.

Second Example Embodiment

A description is now given of a second example embodiment of plastic article 10, in which the description common to the first example embodiment may be omitted. In the first example embodiment, the incomplete transfer face of convex shape and the incomplete transfer face of concave shape are formed at different faces of plastic article 10. In the second example embodiment, the incomplete transfer face of convex shape and the incomplete transfer face of concave shape may be formed at a same face of plastic article 10.

Plastic Article

Figure 10:
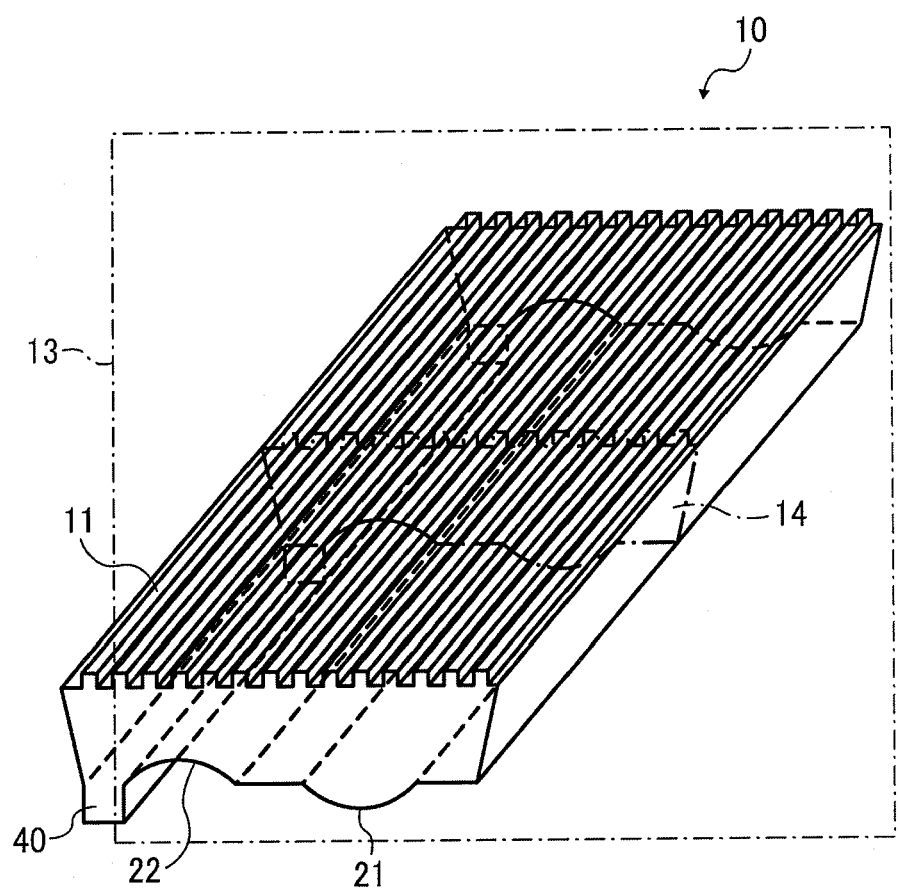
FIG. 10 shows a perspective view of a plastic article according to a second example embodiment.

FIG. 10 shows a perspective view of plastic article 10 according to a second example embodiment. The plastic article 10 has the first transfer face 11 having minute and complex concave/convex shape (disposed at an upper side), and the first incomplete transfer face 21 having the convex shape and the second incomplete transfer face 22 having the concave shape on a same face (disposed at an lower side), which is the opposite side of the first transfer face 11. Further, the projection 40 may be provided to the same face having the first incomplete transfer face 21 and the second incomplete transfer face 22. Further, the second incomplete transfer face 22 having the concave shape may be disposed proximity of the projection 40 such as a root portion of the projection 40. As such, the second incomplete transfer face 22 may be adjacent to the projection 40.

Shaping Method of Plastic Article

Figure 11A:
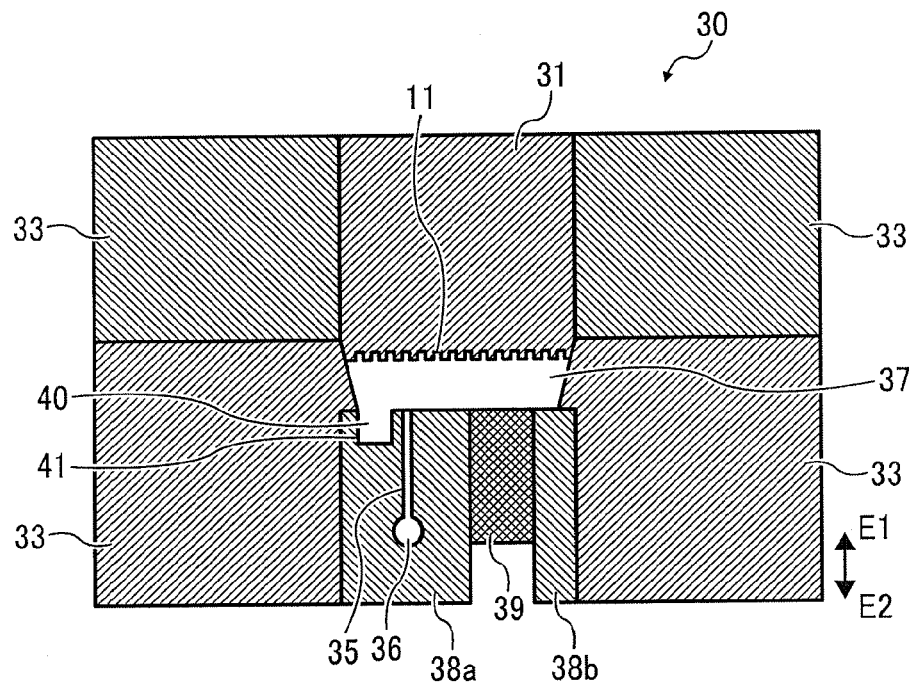
FIGS. 11A and 11B show a cross-sectional view of one metal die for forming the plastic article of FIG. 10.
Figure 11B:
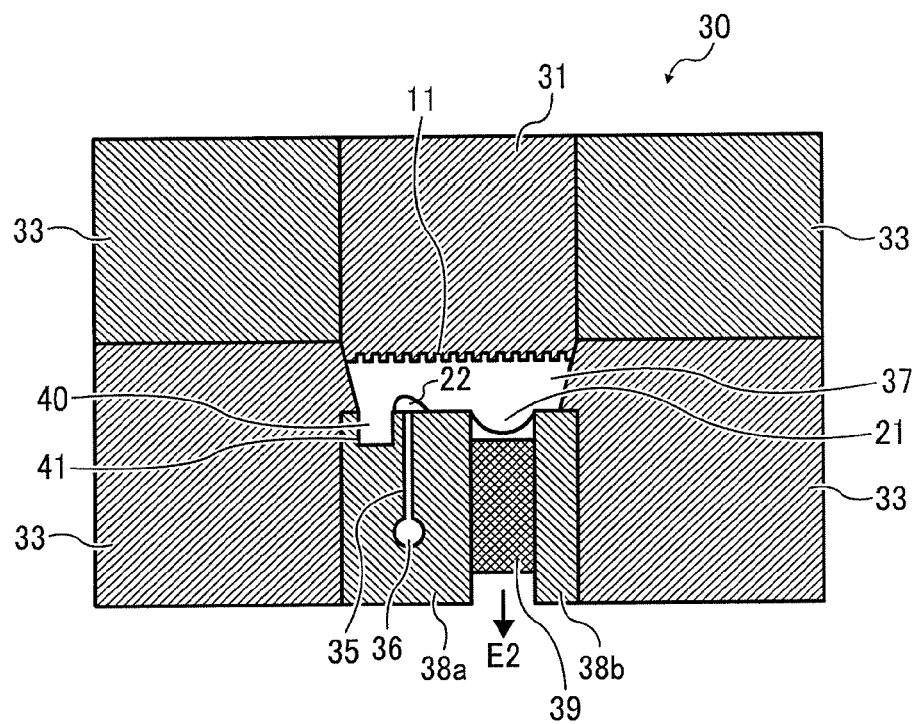

A description is given of an example shaping method of plastic article 10 shown in FIG. 10 with reference to FIGS. 11A and 11B. FIGS. 11A and 11B show a cross-sectional view at the cross-sectional face 14 of the metal die 30 and the plastic article 10 (FIG. 10) made of the hot-melt resin 37.

The metal die 30 may include a pair of metal dies such as the upper and lower dies which can be moved in upward and downward, and a cavity can be defined by such metal dies. The cavity can be injected and filled with the hot-melt resin 37. Specifically, the cavity can be defined by an upper transfer block 31, lower blocks 38a and 38b (may be referred to lower block 38), a movable block 39, and the side block 33. Further, the lower block 38a may be provided with the gas slit 35 and the gas port 36 communicated to the gas slit 35. Further, the movable block 39 may be used with the lower blocks 38a and 38b as a part of the lower block 38. Specifically, the movable block 39 can be slidably moved in a direction shown by an arrow E1/E2 in FIGS. 11A and 11B with respect to the cavity. Further, the lower block 38a may have the concaved portion 41 for forming the projection 40.

The movable block 39 can be slidably moved toward the cavity as shown by an arrow E1 in FIG. 11A and set at a given position as shown in FIG. 11A, and then the hot-melt resin 37 is injected and filled in the cavity. Upon injecting and filling the hot-melt resin 37 in the cavity, a certain pressure occurs on the side faces of the cavity, and then the hot-melt resin 37 starts to cool and solidify while maintaining a closely contacted condition with the side faces of the cavity.

After injecting the hot-melt resin 37 in the cavity, a given time needs to be elapsed to completely cool and solidify the hot-melt resin 37. In other words, the hot-melt resin 37 injected and filled in the cavity is not yet cooled and solidified for a given time, and can maintain fluid condition while also maintaining the resin internal pressure at a given level. While the hot-melt resin 37 still maintains such fluid condition, compressed gas (e.g., air) is supplied to the hot-melt resin 37 through the gas port 36 and the gas slit 35. The time duration that the hot-melt resin 37 can maintain such fluid condition at a given resin internal pressure, which is not yet completely cooled and solidified, can be determined based on types of resin component or other factors.

Further, as shown in FIG. 11B, the movable block 39 can be slidably moved in a direction separating from the side face of cavity in a direction shown by an arrow E2 in FIG. 11B (separation direction). The cavity volume expands due to the movement of the movable block 39 (retreating movement of the movable block 39), and the volume of the hot-melt resin 37 also expands. As a result, the first incomplete transfer face 21 having the convex shape is formed at a portion corresponding to the retreated movement of the movable block 39. Further, due to the volume expansion of the hot-melt resin 37, the resin internal pressure falls rapidly, by which the adhesiveness of the hot-melt resin 37 with the side faces of cavity becomes low.

Under such condition, the resin pressurized by the compressed gas (e.g., air) supplied from the gas slit 35 can be firstly separated from the lower block 38a, by which the second incomplete transfer face 22 having the concave shape can be formed.

The projection 40 can be cooled and solidified faster than other portions of resin such as a transfer face area of the cavity. After separating the resin from the lower block 38a, the second incomplete transfer face 22 having the concave shape can grow by a shrinking phenomenon of resin, and can be formed along a root of the projection 40 having a faster shrinking speed. By disposing the projection 40 (prepared by setting the concaved portion 41), the growing of the second incomplete transfer face 22 having the concave shape can be confined in a given area of the plastic article 10.

As such, as similar to the first example embodiment, in the second example embodiment, the shrinkage may not spread or progress to the first transfer face 11, and the resin internal pressure may not remain inside the plastic article 10. Therefore, the plastic article 10 can be formed by enhancing the shape precision of the first transfer face 11, shaped with the required shape precision, and by lowering the internal strain.

Further, in the second example embodiment, the transfer face 11 has the minute and complex concave/convex shape and such minute and complex concave/convex shape is transferred from the surface of upper transfer block 31 having the corresponding minute and complex concave/convex shape. When the plastic article 10 is to be formed using such upper transfer block 31, the pressure of resin injected to the cavity defined by such minute patterns may need to be set at a high pressure to effectively fill the minute patterns with the resin so that the transfer face 11 can be correctly transferred and formed. Such high resin internal pressure occurring when filling the resin by the injection method can be induced to substantially zero by conducting the shaping method of the above described second example embodiment. With such a configuration, the plastic article 10 can be formed by decreasing the residual internal stress, or in particular without the residual internal stress, and thereby the shape deformation of the plastic article 10 when removing the plastic article 10 from the metal die 30 and after removing the plastic article 10 from the metal die 30 can be prevented.

Further, the face shape other than the first transfer face 11 may not limited to any specific shape. Further, the first incomplete transfer face 21 of convex shape, the second incomplete transfer face 22 of the concave shape, and the projection 40 can be formed at any faces of plastic article 10 except the transfer face 11. Further, the number of the first incomplete transfer face 21 having the convex shape and the number of the second incomplete transfer face 22 having the concave shape, and the number of the projection 40 are not limited to one but such face and projection can be formed with a plurality of numbers. Further, the above described second shaping method (see ☒ 6) can be similarly used.

With the shaping method of plastic article according to the second example embodiment, a plastic article having a high degree of precision optical face and/or a minute and complex concave/convex shape pattern can be formed by transferring face shapes defined by a metal die with a high degree of precision and a reduced cost.

Third Example Embodiment

A description is given of third example embodiment of plastic article 10, in which the description common to the first and second embodiments may be omitted.

Plastic Article

Figure 12:
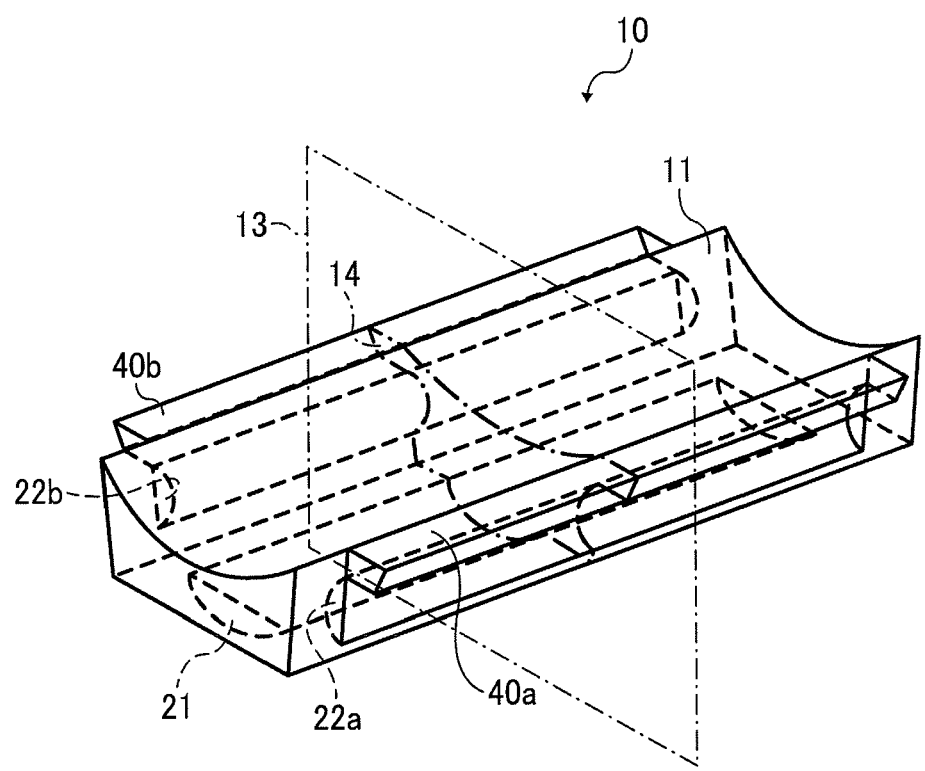
FIG. 12 shows a perspective view of a plastic article according to a third example embodiment.

A description is given of an example shaping method of plastic article 10 according to a third example embodiment with reference to FIG. 12. FIG. 12 shows a perspective view of the plastic article 10. The plastic article 10 has the transfer face 11 having the concave shape (disposed at an upper side), and the first incomplete transfer face 21 having the convex shape (disposed at a lower side). Further, the second incomplete transfer face 22a having the concave shape, and the second incomplete transfer face 22b having the concave shape are formed at each side of the transfer face 11 as shown in FIG. 12. Further, the projection 40a is formed on a same face forming the second incomplete transfer face 22a having the concave shape, and the projection 40b is formed on a same face forming the second incomplete transfer face 22b having the concave shape. Specifically, the second incomplete transfer face 22a having the concave shape may be disposed proximity of the projection 40a such as a root portion of the projection 40a, and the second incomplete transfer face 22b having the concave shape may be disposed proximity of the projection 40b such as a root portion of the projections 40b. As such, the second incomplete transfer face 22 may be adjacent to the projection 40.

Shaping Method of Plastic Article

Figure 13A:
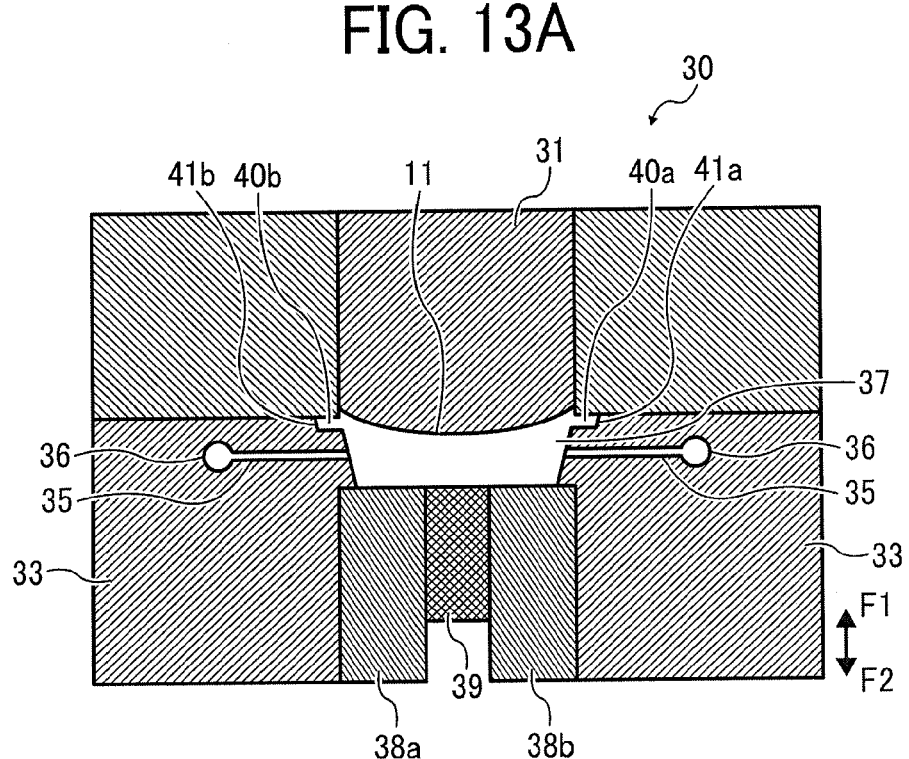
FIGS. 13A and 13B show a cross-sectional view of one metal die for forming the plastic article of FIG. 12.
Figure 13B:
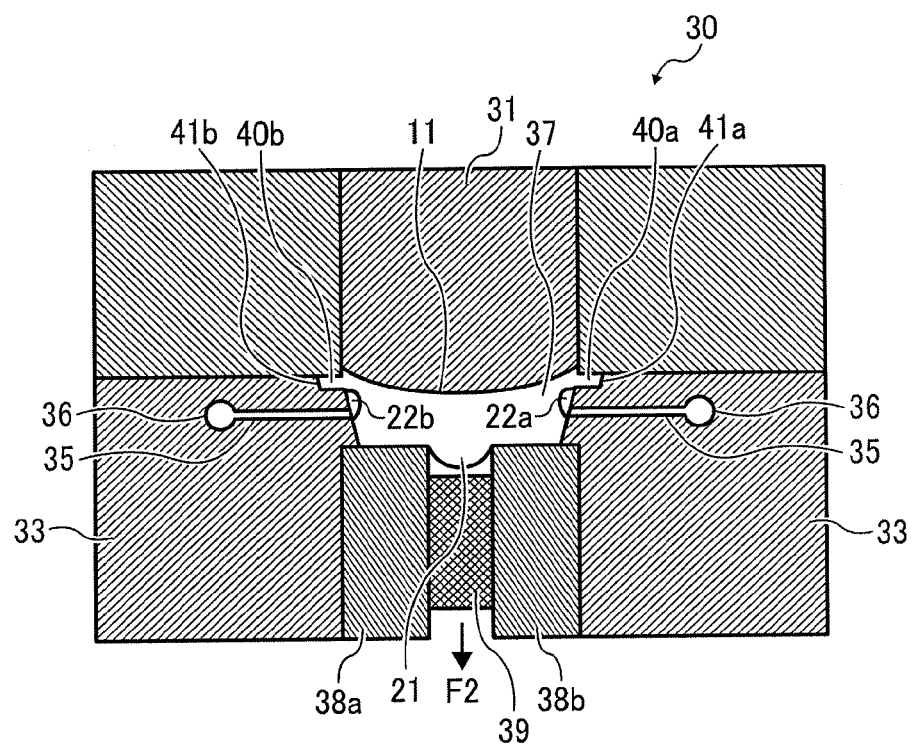

A description is given of an example shaping method of plastic article 10 shown in FIG. 12 with reference to FIGS. 13A and 13B. FIGS. 13A and 13B show a cross-sectional view at the cross-sectional face 14 of the metal die 30 and the plastic article 10 (FIG. 12) made of the hot-melt resin 37.

The metal die 30 may include a pair of metal dies such as the upper and lower dies which can be moved in upward and downward, and a cavity can be defined by such metal dies. The cavity can be injected and filled with the hot-melt resin 37. Specifically, the cavity can be defined by the upper transfer block 31, the lower blocks 38a and 38b (may be referred to lower block 38), the movable block 39, and the side blocks 33. Further, each of the side blocks 33 may be provided with the gas slit 35 and the gas port 36 communicated to the gas slit 35. Further, the movable block 39 may be used with the lower blocks 38a and 38b as a part of the lower block 38. Specifically, the movable block 39 can be slidably moved in a direction shown by an arrow F1/F2 in FIG. 13A with respect to the cavity. Further, one of the side blocks 33 may have a concaved portion 41a for forming the projection 40a, and another one of the side blocks 33 may have a concaved portion 41 for forming the projection 40b.

The movable block 39 can be slidably moved toward the cavity in a direction shown by an arrow F1 in FIG. 13A and set at a given position as shown in FIG. 13A, and then the hot-melt resin 37 is injected and filled in the cavity. Upon injecting and filling the hot-melt resin 37 in the cavity, a certain pressure occurs on the side faces of the cavity, and then the hot-melt resin 37 starts to cool and solidify while maintaining a closely contacted condition with the side faces of the cavity.

After injecting the hot-melt resin 37 in the cavity, a given time needs to be elapsed to completely cool and solidify the hot-melt resin 37. In other words, the hot-melt resin 37 injected and filled in the cavity is not yet cooled and solidified for a given time, and can maintain fluid condition while also maintaining the resin internal pressure at a given level. While the hot-melt resin 37 still maintains such fluid condition, compressed gas (e.g., air) is supplied to the hot-melt resin 37 through the gas port 36 and the gas slit 35 disposed for both of the side blocks 33. The time duration that the hot-melt resin 37 can maintain such fluid condition at a given resin internal pressure, which is not yet completely cooled and solidified, can be determined based on types of resin component or other factors.

Further, as shown in FIG. 13B, the movable block 39 can be slidably moved in a direction separating from a bottom face of cavity (i.e., one side face of cavity) in a direction shown by an arrow F2 in FIG. 13B (separation direction). The cavity volume expands due to the movement of the movable block 39 (retreating movement of the movable block 39), and the volume of the hot-melt resin 37 also expands. As a result, the first incomplete transfer face 21 having the convex shape is formed at a portion corresponding to the retreated movement of the movable block 39.

Further, due to the volume expansion of the hot-melt resin 37, the resin internal pressure falls rapidly, by which the adhesiveness of the hot-melt resin 37 with the side faces of cavity becomes low.

Under such condition, the resin pressurized by the compressed gas (e.g., air) supplied from the gas slit 35 can be firstly separated from the side blocks 33, by which the second incomplete transfer faces 22a and 22b having the concave shape can be formed.

The projections 40a and 40b can be cooled and solidified faster than other portions of resin such as a transfer face area of the cavity. After separating the resin from the side blocks 33, the second incomplete transfer faces 22a and 22b having the concave shape can grow by a shrinking phenomenon of resin, and can be formed along a root of the projections 40a and 40b having a faster shrinking speed. By disposing the projections 40a and 40b (prepared by setting the concaved portion 41), the growing of the second incomplete transfer faces 22a and 22b having the concave shape can be confined in a given area of the plastic article 10.

As such, as similar to the first and second example embodiments, in the third example embodiment, the shrinkage may not spread or progress to the first transfer face 11, and the resin internal pressure may not remain inside the plastic article 10. Therefore, the plastic article 10 can be formed by enhancing the shape precision of the first transfer face 11, shaped with the required shape precision, and by lowering the internal strain.

Fourth Example Embodiment

A description is given of fourth example embodiment of plastic article 10, in which the description common to the first, second, and third embodiments may be omitted.

Figure 14A:
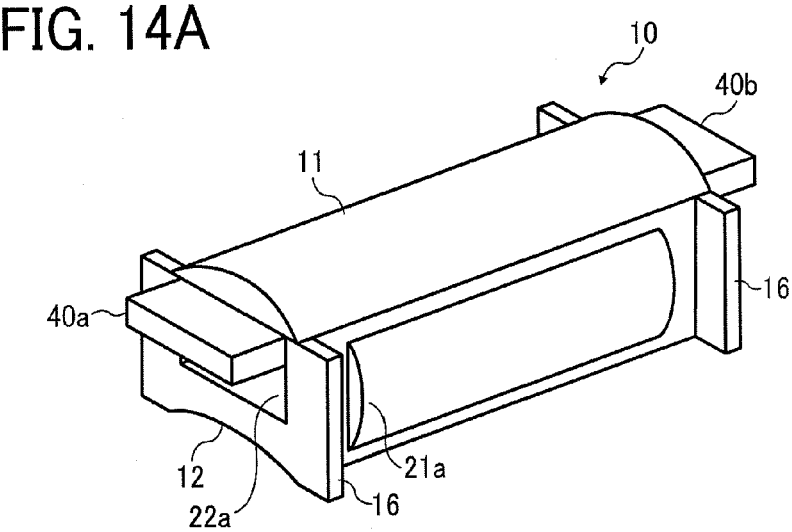
FIGS. 14A, 14B and 14C show a perspective view of a plastic article according to a fourth example embodiment.
Figure 14B:
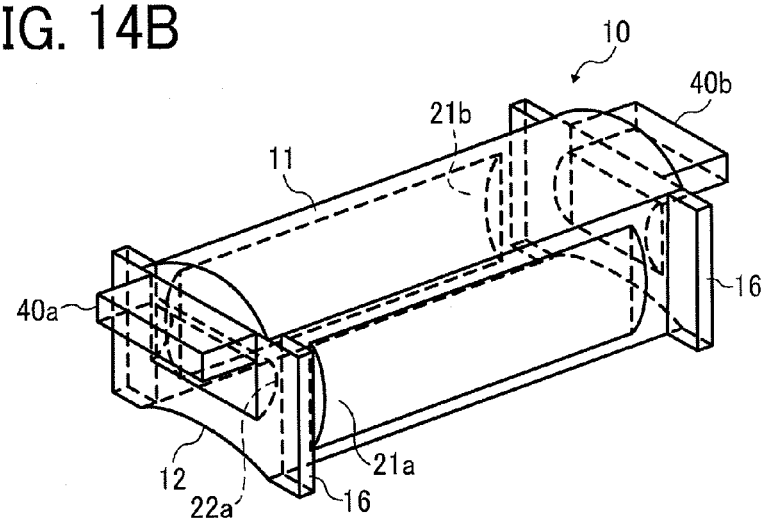
Figure 14C:
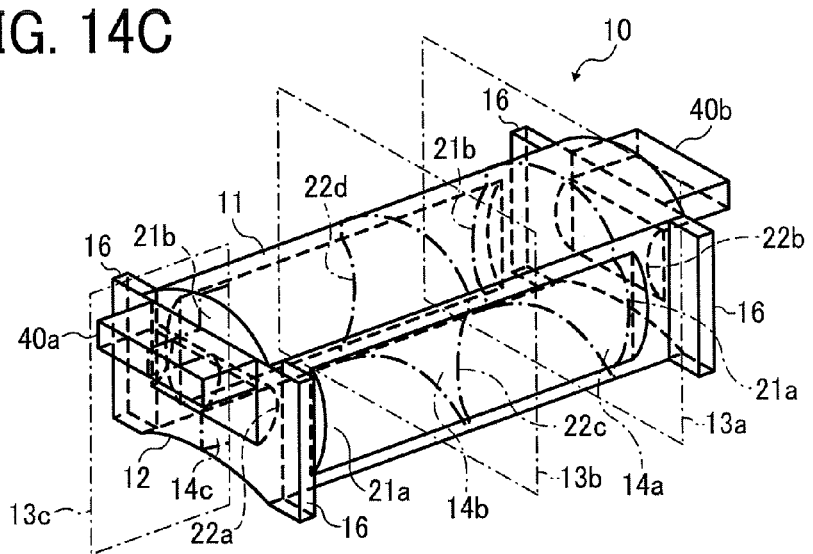

A description is given of an example shaping method of plastic article 10 according to a fourth example embodiment with reference to FIGS. 14A, 14B and 14C. FIG. 14A shows a perspective view of the plastic article 10. FIG. 14B shows a perspective view of the plastic article 10 added with some hidden lines. FIG. 14C shows a perspective view of the plastic article 10 added with some cross section areas, in which each of cross section areas is respectively shown in FIGS. 15A, 15B and 15C. In FIGS. 14A, 14B and 14C, the first transfer face 11 and the second transfer face 12 of the plastic article 10 may be used as an optical face, and the plastic article 10 may be used as a plastic lens 10 but not limited thereto.

Figure 15A:
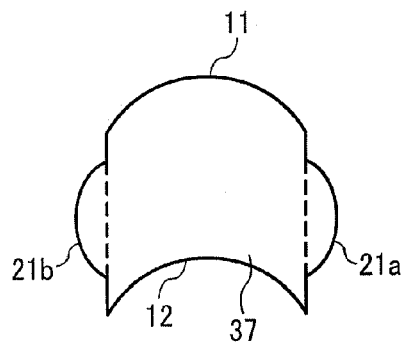
FIGS. 15A, 15B and 15C show cross-sectional views of the plastic article of FIGS. 14A, 14B and 14C cut at different positions of the plastic article.
Figure 15B:
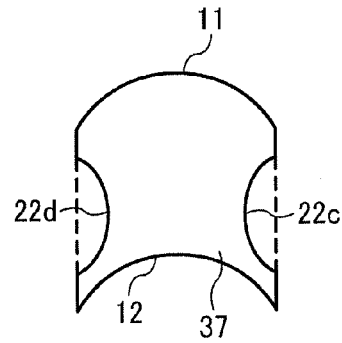
Figure 15C:
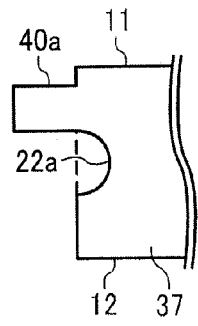

FIG. 15A shows a cross-sectional view of the plastic lens 10 when the plastic lens 10 is cut at a cross-sectional face 14a perpendicular to the first transfer face 11 (i.e., dashed dotted line 13a of FIG. 14C). FIG. 15B shows a cross-sectional view of the plastic lens 10 when plastic lens 10 is cut at a cross-sectional face 14b perpendicular to the first transfer face 11 (i.e., dashed dotted line 13b of FIG. 14C). FIG. 15C shows a cross-sectional view of the plastic lens 10 when plastic lens 10 is cut at a cross-sectional face 14c perpendicular to the first transfer face 11 (i.e., dashed dotted line 13c of FIG. 14C).

Figure 16A:
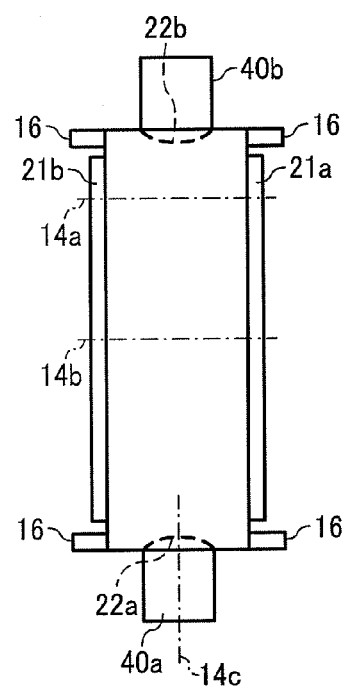
FIGS. 16A and 16B show a plan view of the plastic article of FIGS. 14A, 14B and 14C.
Figure 16B:
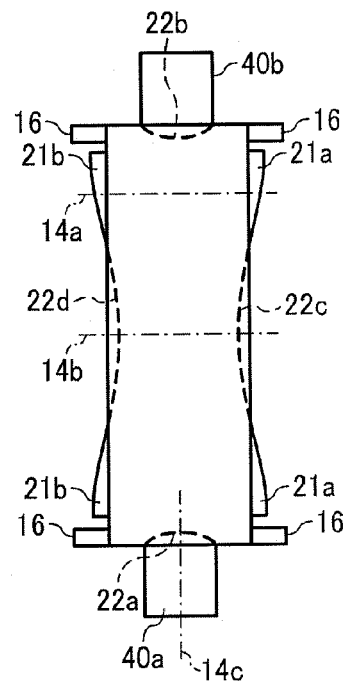
Figure 17A:
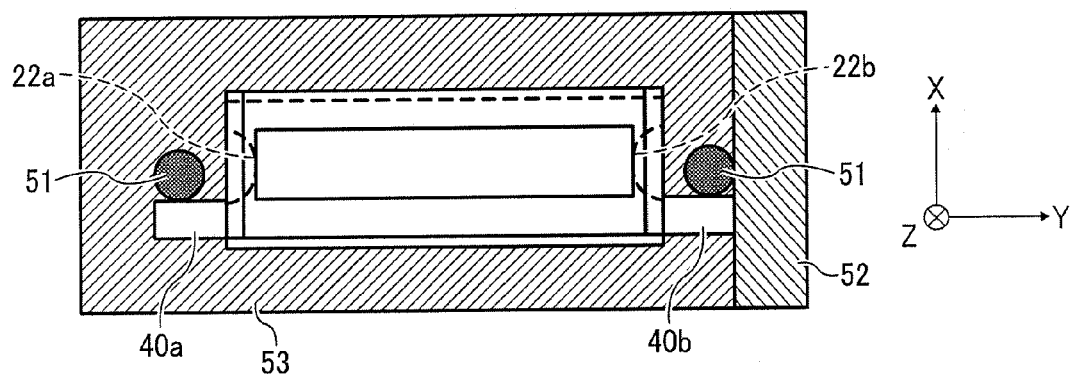
FIGS. 17A and 17B show side views of the plastic article of FIGS. 14A, 14B and 14C placed on a stand.
Figure 17B:
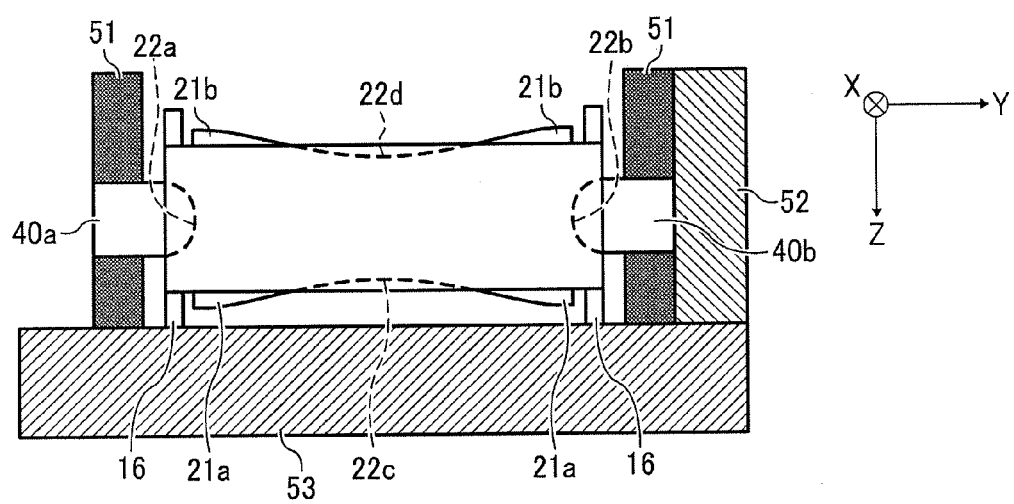

FIGS. 16A and 16B show a plan view of the plastic lens 10 shown in ⊠ in which the plastic lens 10 is viewed from the transfer face 11 when the plastic lens 10 is in the cavity of the metal die. FIG. 16A shows a plan view of the plastic lens 10 in the cavity just after slidably moving a movable block, in which the resin internal pressure is reduced. FIG. 16B shows a plan view of the plastic lens 10 in the cavity after cooling and solidifying the plastic lens 10. Further, FIGS. 17A and 17B show the plastic lens 10 placed in a given stand using an attachment reference face 16, in which FIG. 17A shows a one side of transfer face of the plastic lens 10, and FIG. 17B shows another side of a transfer face of the plastic lens 10.

The plastic lens 10 has a long side direction and a short side direction. As shown in FIGS. 14 to 17, the first incomplete transfer face 21a having the convex shape and the first incomplete transfer face 21b having the convex shape may be disposed at each side with respect to the short side direction of the plastic lens 10. Further, the second incomplete transfer face 22a having the concave shape formed at proximity of the projection 40a, and the second incomplete transfer face 22b having the concave shape formed at proximity of the projection 40b may be disposed a position close to each end of the long side direction of the plastic lens 10.

The first incomplete transfer face 21a and the first incomplete transfer face 21b may have the following shapes. As shown in FIG. 15A, the first incomplete transfer face 21a and the first incomplete transfer face 21b may have the convex shape at the cross-sectional face 14a, which is close to each end of the long side direction of plastic lens 10. As shown in FIG. 15B, the incomplete transfer face 22c having and the incomplete transfer face 22d may have the concave shape at the cross-sectional face 14b, which is close to the center portion of the long side direction of plastic lens 10. As such, the incomplete transfer face (i.e., 21a and 21b) may gradually change its shape from the convex shape to the concave shape as close to the center portion of the long side direction of the plastic lens 10.

Further, the plastic lens 10 has an attachment reference face 16 at each end of the long side direction of plastic lens 10. The attachment reference face 16 can be formed by transferring a shape of metal die to the resin forming the plastic lens 10, and is used to place the plastic lens 10 on a plain face such as stand or the like.

The plastic lens 10 of the fourth example embodiment can be formed by using the above described shaping methods according to the above example embodiments. For example, the first incomplete transfer face 21a having the convex shape and the first incomplete transfer face 21b having the convex shape may be formed by using the above described movable block for the metal die, and the second incomplete transfer face 22a having the concave shape and the second incomplete transfer face 22b having the concave shape may be formed by using the block having the gas slit for the metal die, in which the block may be used as the firstly-face-separating block.

When the above described shaping method using a retreating movement of the movable block is applied for forming the plastic lens 10, the resin volume expands right after the retreating movement of the movable block, at which the plastic lens 10 may have a shape shown in FIG. 16A. FIG. 16A shows a condition that the first incomplete transfer face 21a and the first incomplete transfer face 21b, corresponding to the retreating movement of the movable block, have the convex shape along the short side direction of the plastic lens 10, and the second incomplete transfer face 22a and the second incomplete transfer face 22b at the root of the projection 40 have the concave shape.

However, as the cooling and solidifying proceed after the condition shown in FIG. 16A, the shrinking of resin occurs for the plastic lens 10 (i.e., formed article). During such cooling and solidifying period, at each end of the plastic lens 10, the second incomplete transfer face 22 having the concave shape formed along the root of the projection 40, corresponded to the gas slit set for the metal die, may function as the transfer-free face of the plastic article 10 to mitigate the effect of resin shrinking. In contrast, at the center portion of plastic lens 10, the first incomplete transfer faces 21a and 21b having the convex shape, corresponding to the separated movable block may receive the effect of resin shrinking. Therefore, as the resin shrinking proceeds, the first incomplete transfer face 21a having the convex shape and the first incomplete transfer face 21b having the convex shape may change their face shapes to an incomplete transfer face 22c having the concave shape and an incomplete transfer face 22d having the concave shape, respectively, around the center portion of the long side direction of plastic lens 10.

Therefor, as shown in FIG. 16B, the plastic lens 10 may be formed by gradually changing the shape of the incomplete transfer face from the end side to the center portion of plastic article 10, in which the incomplete transfer faces corresponded to the movable blocks have the convex shapes 21a and 21b at the end side of plastic article 10, and also have the concave shapes 22c and 22d at the center portion of the plastic lens 10 when the plastic lens 10 is a formed by using the above described shaping methods.

As such, as similar to the first to third example embodiments, as for the plastic lens 10 formed in the fourth example embodiment using the injection molding with the metal die, the first incomplete transfer face 21a having the convex shape and the first incomplete transfer face 21b having the convex shape, and the incomplete transfer face 22c having the concave shape and the incomplete transfer face 22d having the concave shape are formed at portions corresponding to the movable block. Further, the second incomplete transfer face 22a having the concave shape and the second incomplete transfer face 22b having the concave shape are formed at portions corresponding to the root of the projection 40 and the gas slit set for the metal die.

With such a configuration, the shrinkage may not spread or progress to the first transfer face 11 and the second transfer face 12, and the resin internal pressure may not remain inside the plastic lens 10. Therefore, the plastic lens 10 can be formed by enhancing the shape precision of the first transfer face 11 and the second transfer face 12, shaped with the required shape precision, and by lowering the internal strain.

The incomplete transfer face 21 having the convex shape and the incomplete transfer face 22 having the concave shape are used as the transfer-free face of the plastic lens 10, which are formed without an exact transfer of the side face shapes of the cavity of the metal die. Accordingly, if the incomplete transfer face of plastic article is used as a positioning face to position the plastic article in a space, the position of plastic article may become unstable and the positioning precision of plastic article may not be attained.

Therefore, as shown in FIGS. 14 to 17, the plastic lens 10 according to the fourth example embodiment preferably has the attachment reference face 16 in addition to the incomplete transfer face. Specifically, the attachment reference face 16 is formed at the both end side of the plastic lens 10, by which the attachment reference face 16 is disposed at the side of the first incomplete transfer face 21 having the convex shape and at the side of the incomplete transfer face 22 having the concave shape, and the attachment reference face 16 has a given height set higher than the convex shape 21a/21b by transferring a given shape of the metal die. With such a configuration, without using the incomplete transfer face having the convex shape or the concave shape, the plastic article can be positioned and placed at a given face such as a stand with a high degree of precision.

Further, because the above described effect of reducing the residual internal stress can be applied to the attachment reference face 16, the shape of attachment reference face 16 can be formed with a high degree of precision, by which the plastic lens 10 having the attachment reference face 16 can be formed by enhancing the shape transfer precision. Further, the attachment reference face 16 can be disposed at any face except the transfer face of article by setting a position, a shape, and the number for the attachment reference face 16, which are not limited to a specific number.

For example, as shown in FIG. 17B, the plastic lens 10 can be positioned in a space with a high degree of precision in the z-axis direction 53, by which an optical property of optical unit employing the plastic lens 10 can be enhanced.

Further, the projection 40 may not include the incomplete transfer face of the concave shape, and can be formed without receiving an adverse effect during the cooling and shrinking, by which the projection 40 can be formed with a high transfer precision, and the projection 40 can be used as the attachment reference face as similar to the attachment reference face 16. For example, as shown in FIGS. 17A and 17B, the X axis direction 51 and the Y axis direction 52 can be used as an attachment reference position. With such a configuration, the attachment reference face of the plastic lens 10 can be disposed separately from the incomplete transfer face. Therefore, without using the incomplete transfer face having the convex or concave shapes, the plastic lens 10 can be positioned and placed at a plain such a stand with a high degree of precision.

Figure 19A:
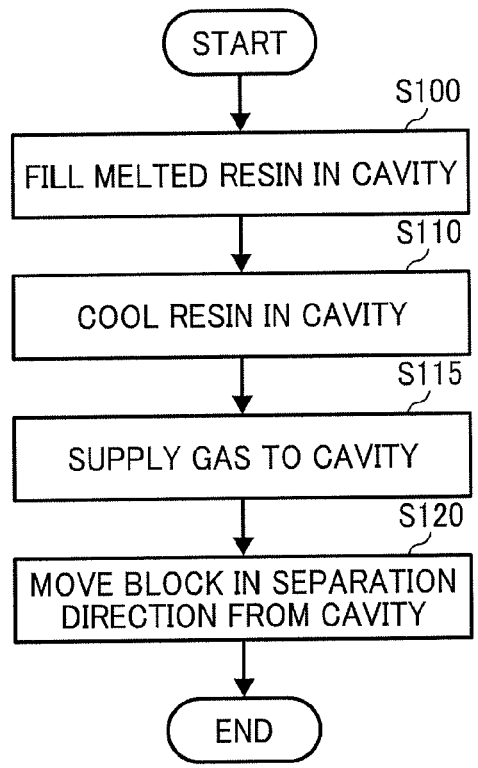
FIGS. 19A and 19B show processes of forming a plastic article according to example embodiments.
Figure 19B:
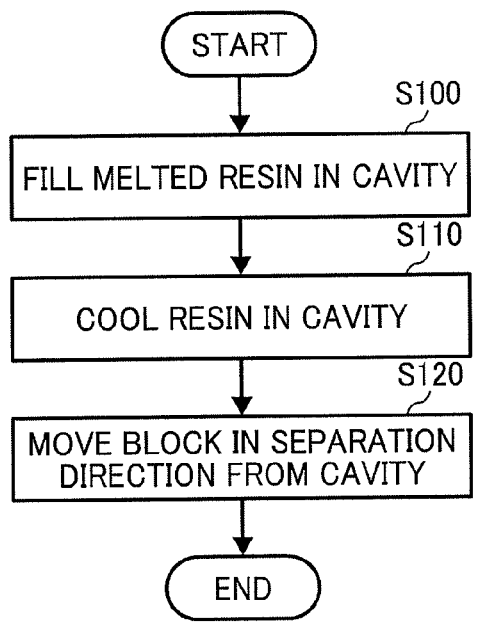

FIGS. 19A and 19B show processes of forming plastic articles according to the above example embodiments. FIG. 19A show a process of forming plastic articles using a metal die having a block disposed with a gas slit, and FIG. 19B show a process of forming plastic articles using a metal die having a block made of a material having a low adhesiveness with resin.

In a case of FIG. 19A, a method of forming and shaping a plastic article is conducted using a metal die having blocks defining a cavity, in which a first block has a transfer face to be transferred to a plastic article, a second block is disposed with a gas supply route, the second block is useable as a firstly-face-separating block from the resin, and a movable block is used as one side face of the cavity. The plastic article can be formed and shaped as follows. At step S100, melted resin is filled in the cavity defined by the metal die, by which a certain pressure occurs in the cavity of the metal die. At step S110, the melted resin is cooled in the cavity for a given time, which can be determined based on information such as resin property, temperature, volume, or the like. At step S115, compressed gas is supplied through the gas supply route to the cavity when the given time elapses after filling the resin. At step S120, the movable block is slidably moved in the separation direction from the cavity. The condition of resin material at steps S115 and S120 can be seen in FIGS. 5B, 8B, 11B, and 13B. With such processing, a plastic article having a transfer face and incomplete transfer face can be formed and shaped with a high degree of precision as above described.

In a case of FIG. 19B, a method of forming and shaping a plastic article is conducted using a metal die having blocks defining a cavity, in which a first block has a transfer face to be transferred to a plastic article, a second block has a face made of material having a low adhesiveness with the resin compared to the surface of other blocks defining the cavity, the second block is useable as a firstly-face-separating block from the resin, and a movable block is used as one side face of the cavity. The plastic article can be formed and shaped as follows. At step S100, melted resin is filled in the cavity defined by the metal die, by which a certain pressure occurs in the cavity of the metal die. At step S110, the melted resin is cooled in the cavity for a given time, which can be determined based on information such as resin property, temperature, volume, or the like. At step S120, when the given time elapses after filling the resin, the movable block is slidably moved in the separation direction from the cavity. The condition of resin material at steps S120 can be seen in FIGS. 6B, and 9B. With such processing, a plastic article having a transfer face and incomplete transfer face can be formed and shaped with a high degree of precision as above described.

(Optical Element)

The above described plastic article can be preferably used as an optical element such as a plastic lens, a plastic mirror, or the like, in which at least one transfer face of plastic article is used as an optical face. When the plastic article used as the optical element requires high degree of shape precision and low internal strain.

Because the residual internal stress of the plastic article according to the example embodiments described above can be set too small, the plastic article having too small internal strain can be formed. Therefore, by employing such plastic article having fewer birefringence as the optical element, the optical element having enhanced property can be devised. Further, by disposing the attachment reference face 16 (see FIGS. 14 to 17), the optical element can be positioned with a high degree of precision and the optical properties of the optical element can be further enhanced.

For example, the plastic article 10 of FIG. 10 can be applied as an optical element using the first transfer face 11 as an optical mirror, in which the optical element can be used as a grating having a minute diffusion effect. Further, the plastic article 10 of FIG. 12 can be applied as a plastic mirror, in which the first transfer face 11 may be used as a mirror face having the concaved shape. Further, the plastic article 10 of FIG. 14 can be applied as a plastic lens, in which the first transfer face 11 may be used as an optical face (e.g., incidence face), and the second transfer face 12 may be used as another optical face (e.g., exit face).

Multi-Beam Scanning Unit

Further, the optical element employing the plastic article according to the example embodiments can be devised with a low internal strain and resultantly low birefringence in addition to the high degree of shaping precision of optical face, by which the optical performance of the optical element can be enhanced.

The internal strain of plastic lens formed by a conventional method may be different at different portions in the plastic lens. If such plastic lens is used for a multi-beam optical scanning system, the light flux incidence position of each light beam in the sub-scanning direction may become different. Therefore, the effect of birefringence may become different among the light beams, by which the optical performance such as intensity and polarity of each beam may become different. In contrast, a plastic lens employing the plastic article according to the example embodiments can reduce, in particular eliminate the internal strain, by which such plastic lens having enhanced properties can be preferably employed for the multi-beam scanning system.

Figure 18:
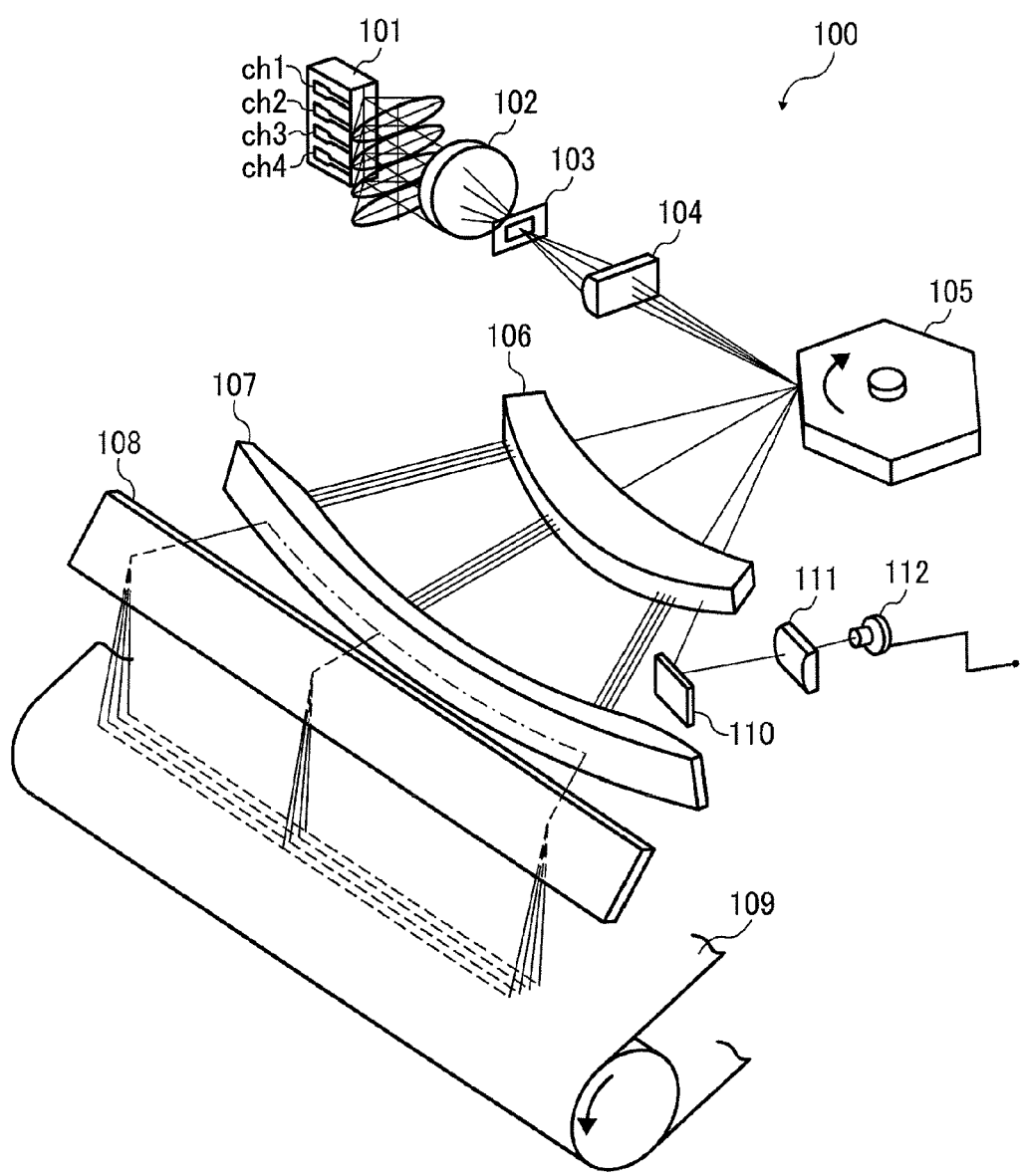
FIG. 18 shows a schematic configuration of optical system employing an optical scanning device according to example embodiments.

FIG. 18 shows an example of multi-beam scanning unit employing an optical scanning device or optical writing unit according to the above example embodiments. In a multi-beam scanning unit 100, a plurality of beams emitted from a plurality of light sources 101 (ch1 to ch4) can be coupled by a coupling lens 102 for optical elements disposed after the coupling lens 102, and the coupled beams are focused near a deflection face of an optical deflector 105 as a plurality of line images using a cylindrical lens 104 (a common line image focusing element) along the main scanning direction while separating the beams in the sub-scanning direction. The beams can be deflected simultaneously by the optical deflector 105 with a same angular speed, and the deflected beams pass a common optical element system such as a first scan lens 106 and a second scan lens 107. The light path of each beam reflects at a reflecting mirror 108, and then the beams separated in the sub-scanning direction can be focused on a photoconductor (i.e., scanned face) as a plurality of light spots, by which a plurality of scanning processes can be conducted simultaneously. An aperture 103 may be used to adjust the beam shape by blocking some surrounding portion of light flux. Further, at least one beam enters a mirror 110 before conducting an optical scanning process, and is focused on a light receiving element 112 by a lens 111. The write-start timing of each beam for optical scanning is determined based on an output signal of the light receiving element 112.

In such optical system, a plastic lens employing a plastic article according to the above described example embodiments, may be used, for example, as the second scan lens 107.

Because the optical element employing a plastic article according to the above described example embodiments may not have the internal strain, the birefringence effect to light flux passing any positions in the sub-scanning direction can be ignored, and the difference of the optical performance of each of beams can be ignored. Therefore, the optical element can be used for the multi-beam optical scanning system with an enhanced effect.

The shapes of cavities, and the shapes of plastic articles that can be formed by the injection molding and the cavities described in the above example embodiments are just examples. The above described shaping methods of plastic articles according to the example embodiments can be applied to cavities having other shapes to form plastic articles having various shapes.

For example, the first incomplete transfer face 21 of the convex shape and the second incomplete transfer face 22 of the concave shape shown in FIG. 7 may not need to be disposed at the opposing faces each other. Specifically, a movable block can be disposed at a position facing the side face 23 to form the side face 23 as the incomplete transfer face having the convex shape. Further, each of the projection 40, the incomplete transfer face 21 of the convex shape and the incomplete transfer face 22 of the concave shape may be disposed for the plastic article 10 with the number of at least one, and further each of the projection 40 and the incomplete transfer faces 21 and 22 can be disposed for the plastic article 10 with the numbers of two or more.

Further, the number of the incomplete transfer face of the convex shape and the incomplete transfer face of the concave shape may not need to be formed with a same number. For example, the incomplete transfer face of the convex shape may be disposed for two faces, and the incomplete transfer face of the concave shape be disposed for one face.

With such a configuration setting the area of the incomplete transfer face greater or the number of the incomplete transfer face greater, the transfer failure can be further effectively induced to the incomplete transfer face, by which the transfer performance of transfer face or transfer portion can be further enhanced. Further, a plurality of projections can be formed on a same face or on different faces of plastic article. Further, in the above described shaping method, the method of filling resin in the cavity, the method of generating pressure for resin, and the method of forming the incomplete transfer face having the convex shape and the concave shape are not limited to the above examples.

Although the plastic article according to the above described example embodiments is applied for an optical element in this disclosure above described described, the plastic article can be applied for other fields. For example, the plastic article can be applied for plastic element requiring a high degree of shape precision for a transfer face such as for example a casing or housing of electronic devices (e.g., cell phones), in which the plastic article is used an external part. Further, although the article is formed as the plastic article using resin as material in the example embodiments, other materials can be used for forming the article, as required.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an article processing apparatus or an article processing system such as an injection molding apparatus or system using a computer-readable program, which can execute the above-described processes or steps. Further, in the above-described exemplary embodiment, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, hard disk in a server, or the like, but not limited these. Further, a computer-readable program can be downloaded to a particular computer (e.g., personal computer) via a network such as the Internet, or a computer-readable program can be installed to a particular computer from the above-mentioned storage device, by which the particular computer may be used for the system or apparatus according to an example embodiment, for example.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A plastic article formable by using a metal die having a cavity to accommodate melted resin therein at a given pressure, the plastic article comprising:
   a transfer face to which is transferred a face shape of the metal die;
   a projection disposed at least one face other than the transfer face;
   an incomplete transfer face having a concave shape disposed at the same face on which the projection is disposed, formed by an incomplete transfer of a face shape of the cavity of the metal die; and
   an incomplete transfer face having a convex shape disposed at least one face other than the transfer face.

2. The plastic article of claim 1, wherein the incomplete transfer face having the concave shape is disposed adjacent to the projection.

3. The plastic article of claim 1, wherein a first thickness "a" of the plastic article in a direction perpendicular to the transfer face and a second thickness "b" of the plastic article in a direction parallel to the transfer face satisfies a relation of a/b<1.

4. The plastic article of claim 3, wherein the first thickness "a" is a minimum thickness in the direction perpendicular to the transfer face, and the second thickness "b" is a maximum thickness in the direction parallel to the transfer face.

5. The plastic article of claim 1, wherein the incomplete transfer face having the concave shape and the incomplete transfer face having the convex shape are disposed at opposing faces other than the transfer face.

6. The plastic article of claim 1, wherein the incomplete transfer face having the concave shape and the incomplete transfer face having the convex shape comprise the same face other than the transfer face.

7. The plastic article of claim 1, further comprising a plurality of projections, wherein the plurality of projections being disposed at a same face or the plurality of projections being disposed at different faces.

8. The plastic article of claim 1, wherein the projection is used as an attachment reference face formed by transferring a face shape of the cavity of the metal die.

9. The plastic article of claim 1, further comprising an attachment reference face to which is transferred a face shape of the cavity of the metal die.

10. The plastic article of claim 1, wherein the transfer face of the plastic article is an optical face of an optical element.

11. An optical scanning device useable as a multi-beam optical scanning device for scanning one scan face by emitting a plurality of light fluxes, comprising the plastic article of claim 10 as an optical element,
   wherein multiple light fluxes strike the optical element at mutually exclusive different positions on the optical element in a sub-scanning direction in which the optical element is scanned by the light fluxes.

* * * * *